(12) United States Patent
Awad et al.

(10) Patent No.: US 10,884,891 B2
(45) Date of Patent: Jan. 5, 2021

(54) INTERACTIVE DETECTION OF SYSTEM ANOMALIES

(71) Applicant: Hewlett Packard Enterprise Development LP, Houston, TX (US)

(72) Inventors: Morad Awad, Haifa (IL); Gil Elgrably, Haifa (IL); Mani Fischer, Haifa (IL); Renato Keshet, Haifa (IL); Mike Krohn, Bristol (GB); Alina Maor, Haifa (IL); Ron Maurer, Haifa (IL); Igor Nor, Haifa (IL); Olga Shain, Haifa (IL); Doron Shaked, Tivon (IL)

(73) Assignee: MICRO FOCUS LLC, Santa Clara, CA (US)

( * ) Notice: Subject to any disclaimer, the term of this patent is extended or adjusted under 35 U.S.C. 154(b) by 67 days.

(21) Appl. No.: 15/325,847

(22) PCT Filed: Dec. 11, 2014

(86) PCT No.: PCT/US2014/069745
§ 371 (c)(1),
(2) Date: Jan. 12, 2017

(87) PCT Pub. No.: WO2016/093836
PCT Pub. Date: Jun. 16, 2016

(65) Prior Publication Data
US 2017/0192872 A1    Jul. 6, 2017

(51) Int. Cl.
*G06F 17/00* (2019.01)
*G06F 11/34* (2006.01)
(Continued)

(52) U.S. Cl.
CPC ...... *G06F 11/3476* (2013.01); *G06F 11/3072* (2013.01); *G06F 11/3452* (2013.01);
(Continued)

(58) Field of Classification Search
CPC ............. G06F 11/3476; G06F 11/3072; G06F 11/3452; G06F 17/18; G06F 17/30516;
(Continued)

(56) References Cited

U.S. PATENT DOCUMENTS 7,055,062 B2  5/2006  Shah et al.
7,310,590 B1  12/2007  Pansal
(Continued)

FOREIGN PATENT DOCUMENTS

CN  102141997 A  8/2011
CN  102163198 A  8/2011
(Continued)

OTHER PUBLICATIONS

"Challenges and Opportunities with Big Data"; Feb. 22, 2012; http://www.purdue.edu/discoverypark/cyber/assets/pdfs/BigDataWhitePaper.pdf.
(Continued)

*Primary Examiner* — Jason T Edwards

(57) ABSTRACT

Interactive detection of system anomalies is disclosed. One example is a system including a data processor, an anomaly processor, and an interaction processor. Input data related to a series of events and telemetry measurements is received by the data processor. The anomaly processor detects presence of a system anomaly in the input data, the system anomaly indicative of a rare situation that is distant from a norm of a distribution based on the series of events and telemetry measurements. The interaction processor is communicatively linked to the anomaly processor and to an interactive graphical user interface. The interaction processor displays, via the interactive graphical user interface, an output data stream based on the presence of the system anomaly, receives, from the interactive graphical user interface, feedback data associated with the output data stream, and
(Continued)

provides the feedback data to the anomaly processor for operations analytics based on the feedback data.

20 Claims, 9 Drawing Sheets

(51) Int. Cl.
   | | |
   |---|---|
   | *G06F 17/18* | (2006.01) |
   | *G06F 17/40* | (2006.01) |
   | *G06K 9/00* | (2006.01) |
   | *G06K 9/62* | (2006.01) |
   | *G06F 11/30* | (2006.01) |
   | *G06F 16/2455* | (2019.01) |
   | *G06F 3/0484* | (2013.01) |

(52) U.S. Cl.
   CPC ........ *G06F 16/24568* (2019.01); *G06F 17/18* (2013.01); *G06F 17/40* (2013.01); *G06K 9/00543* (2013.01); *G06K 9/6284* (2013.01); *G06F 3/04842* (2013.01); *G06F 2201/86* (2013.01)

(58) Field of Classification Search
   CPC .. G06F 17/40; G06F 3/04842; G06F 2201/86; G06F 16/24568; G06K 9/00543; G06K 9/6284
   USPC .......................................................... 715/736
   See application file for complete search history.

(56) References Cited

U.S. PATENT DOCUMENTS

| | | | |
|---|---|---|---|
| 7,519,860 B2 | 4/2009 | Hatonen et al. | |
| 7,689,455 B2 | 3/2010 | Fligler et al. | |
| 7,716,169 B2 | 5/2010 | Park et al. | |
| 7,920,983 B1* | 4/2011 | Peleg | G01M 3/2807 702/100 |
| 8,341,159 B2 | 12/2012 | Gates | |
| 8,370,362 B2 | 2/2013 | Szabo | |
| 8,566,943 B2 | 10/2013 | Martynenko et al. | |
| 8,630,443 B2 | 1/2014 | Tan et al. | |
| 8,667,385 B1 | 3/2014 | Mui et al. | |
| 8,776,234 B2 | 7/2014 | Doukhvalov | |
| 8,887,286 B2 | 11/2014 | Dupont et al. | |
| 8,966,392 B2 | 2/2015 | Antony et al. | |
| 8,996,350 B1 | 3/2015 | Dub et al. | |
| 9,003,023 B2 | 4/2015 | Crank et al. | |
| 9,069,957 B2 | 6/2015 | Tuvell et al. | |
| 9,130,860 B1* | 9/2015 | Boe | G06F 17/30572 |
| 2005/0146431 A1* | 7/2005 | Hastings | G06F 19/00 340/539.12 |
| 2007/0038625 A1 | 2/2007 | Yang-Stephens et al. | |
| 2007/0043723 A1 | 2/2007 | Bitan et al. | |
| 2007/0203885 A1 | 8/2007 | Kim et al. | |
| 2007/0213599 A1* | 9/2007 | Siejko | A61B 5/00 600/300 |
| 2007/0294591 A1* | 12/2007 | Usynin | G06F 1/30 714/45 |
| 2008/0255438 A1* | 10/2008 | Saidara | A61B 5/14532 600/365 |
| 2009/0150436 A1 | 6/2009 | Godbole et al. | |
| 2010/0077481 A1 | 3/2010 | Polyakov et al. | |
| 2010/0125540 A1 | 5/2010 | Stefik et al. | |
| 2010/0218044 A1* | 8/2010 | Roblett | H04L 43/50 714/32 |
| 2012/0102053 A1 | 4/2012 | Barrett et al. | |
| 2012/0137367 A1* | 5/2012 | Dupont | G06F 21/00 726/25 |
| 2012/0167218 A1 | 6/2012 | Poornachandran et al. | |
| 2013/0030875 A1 | 1/2013 | Lee et al. | |
| 2013/0055145 A1 | 2/2013 | Antony et al. | |
| 2013/0097104 A1 | 4/2013 | Lu et al. | |
| 2013/0144813 A1 | 6/2013 | Sengupta et al. | |
| 2013/0150684 A1* | 6/2013 | Cooner | A61B 5/1101 600/595 |
| 2013/0159348 A1 | 6/2013 | Mills et al. | |
| 2013/0253898 A1* | 9/2013 | Meagher | G06F 17/5009 703/18 |
| 2013/0268889 A1 | 10/2013 | Barak et al. | |
| 2013/0298230 A1 | 11/2013 | Kumar et al. | |
| 2014/0006338 A1 | 1/2014 | Watson et al. | |
| 2014/0088442 A1* | 3/2014 | Soykan | B01D 61/243 600/483 |
| 2014/0095548 A1 | 4/2014 | Chen et al. | |
| 2014/0096249 A1 | 4/2014 | Dupont et al. | |
| 2014/0129753 A1 | 5/2014 | Schuette et al. | |
| 2014/0244528 A1* | 8/2014 | Zhang | G06Q 40/02 705/318 |
| 2014/0258197 A1 | 9/2014 | Davulcu et al. | |
| 2014/0258791 A1 | 9/2014 | Kew | |
| 2014/0280142 A1 | 9/2014 | Wasson et al. | |
| 2014/0343997 A1 | 11/2014 | Brown et al. | |
| 2014/0365527 A1 | 12/2014 | Fuchs et al. | |
| 2015/0088808 A1 | 3/2015 | Tyagi et al. | |
| 2015/0095471 A1 | 4/2015 | Singh et al. | |
| 2015/0161394 A1* | 6/2015 | Ferragut | G06F 21/577 726/25 |
| 2015/0193126 A1* | 7/2015 | Whalley | E21B 44/00 715/733 |
| 2016/0085848 A1 | 3/2016 | Kogan et al. | |
| 2016/0217022 A1* | 7/2016 | Velipasaoglu | G06F 11/079 |
| 2017/0070521 A1* | 3/2017 | Bailey | H04L 43/12 |
| 2017/0279838 A1* | 9/2017 | Dasgupta | H04L 63/1425 |

FOREIGN PATENT DOCUMENTS

| | | |
|---|---|---|
| CN | 102194013 A | 9/2011 |
| CN | 103220343 A | 7/2013 |
| EP | 1622044 | 2/2006 |
| IN | 04043CH2014 | 9/2014 |
| KR | 10-2002-0089677 | 11/2002 |
| KR | 10-2003-0094966 | 12/2003 |
| WO | WO-2013090910 | 6/2013 |

OTHER PUBLICATIONS

"Detecting Malware with Your Proxy Logs"; Mar. 23, 2013; 3 pages.
Bruno, Kurtic ;"New Techniques Detect Anomalies in Big Data" published: Jan. 21, 2014; Founding Vice President of Product and Strategy, Sumo Logic; http://tdwi.org/Articles/2014/01/21/Detecting-Big-Data-Anomalies.aspx?Page=1.
Dubey, A. et al.; "A Cluster-level Semi-supervision Model for Interactive Clustering"; Jul. 1, 2010; 16 pages.
Endert, A. et al.; "Toward Usable Interactive Analytics: Coupling Cognition and Computation"; Jul. 18, 2014, 5 pages.
Filed Patent Application. Filed Jun. 27, 2012, U.S. Appl. No. 13/534,342.
Landesberger, T.V. et al.; "Interaction Taxonomy for Tracking of User Actions in Visual Analytics Applications"; Jun. 30, 2012; 18 pages.
Lee, H., Unsupervised Feature Learning via Sparse Hierarchical Representations, (Research Paper), Aug. 2010.
Madni, A.M, et al.; "Exploring and assessing complex systems' behavior through model-driven storytelling", Oct. 5-8, 2014; 6 pages.
Maguitman, A. et al., Dynamic Extraction of Topic Descriptors and Discriminators: Towards Automatic ContextÅL based Topic Search, (Research Paper), Nov. 8-13, 2004.
Nor, Igor et al, "Pushy Analytics for IT Operations".
Pot International Search Report cited in PCT/US2015/045471; dated May 17, 2016; 3 pages.
PCT: "Notification of Transmittal of The International Search Report and The Written Opinion of The International Searching Authority, or The Declaration"; cited Appl. No. PCT/US2014/069745; dated Aug. 17, 2015; 12 pages.

(56) References Cited

OTHER PUBLICATIONS

Shebuti Rayana et al., "An Ensemble Approach for Event Detection and Characterization in Dynamic Graphs," 2014 ACM SIGKDD—International Conference on Knowledge Discovery and Data Mining, 10 pages, Aug. 24, 2014.
Taghrid Samak, et al: "Online Fault and Anomaly Detection for Large-scale Scientific Workflows"; 2011 http://dl.acm.org/citation.cfm?id=2058100.
Thienne Johnson et al., "Network Anomaly Detection Using Autonomous System Flow Aggregates," GLOBECOM 2014—Communication and Information System Security Symposium, 22 pages, Dec. 8-12, 2014.
Xu, X., A New Sub-topic Clustering Method Based on Semi-supervised Learning, (Research Paper), Oct. 2012, pp. 2471-2478, vol. 7, No. 10.
Xudong Zhu, Hui Li; "Activity Clustering for Anomaly Detection"; Sep. 2013; http://dl.acm.org/citation.cfm?id=2528344.
Harutyunyan, A.N. et al., "Abnormality Analysis of Streamed Log Data," (Research Paper), 2014, IEEE Network Operations and Management Symposium (NOMS). 7 pages, available at https://www.researchgate.net/profile/Ashot_Harutyunyan2/publication/258283297_Abnormality_Analysis_of_Streamed_Log_Data/links/0c96052d912a202e1b000000.pdf.
Kim, H. et al., "Behavior-based Anomaly Detection on Big Data," (Research Paper), Australian Information Security Management Conference, 2015, 9 pages, available at http://ro.ecu.edu.au/cgi/viewcontent.cgi?article=1162&context=ism.
M. R. Carey and D. S. Johnson: "Computers and Intractability: A Guide to the Theory of NP-Completeness". W. H. Freeman, 1979;14 pages.
Wang, W. et al., "Processing cf Massive Audit Data Streams for Real-time Anomaly Intrusion Detection," (Research Paper), Oct. 13, 2007, Computer Communications 31.1, pp. 58-72, available at https://mine.kaust.edu.sa/Documents/papers/comcom_2008.pdf.
A. Aizawa, "An information-theoretic perspective of tf-idf measures", Information Processing and Management 39 (2003), pp. 45-65.
A. Amir, et al.,"Cycle Detection and Correction", ICALP (1), Jul. 2010, pp. 43-54.
G. Forman, "BNS Feature Scaling: an improved representation over TF-IDF for SVM Text Classification", CIKM, Oct. 2008, pp. 263-270.
G. Landau, et al., "Introducing Efficient Parallelism into Approximate String Matching and New Serial Algorithm", In 18th ACM STOC, 1986, pp. 220-230.
M. Aharon, et al., "One Graph Is Worth a Thousand Logs: Uncovering Hidden Structures in Massive System Event Logs", ECML/PKDD, Part I, LNAI 5781, 2009, pp. 227-243.
T. Mori, et al., "Term Weighting Method based on Information Gain Ratio for Summarizing Documents retrieved by IR systems," Journal of Natural Language Processing, vol. 9, Issue 4, 2002, pp. 3-32.
W. Xu, et al., "Detecting Large-Scale System Problems by Mining Console Logs", ACM Symposium on Operating Systems Principles, 2009, 16 pages.
WikipediA, "Generalized Suffix Tree", retrieved from the Internet on Dec. 7, 2018, 2 pages. <http://en.wikipedia.org/wiki/Generalized_suffix_tree>.
WikipediA, "Levenshtein Distance", retrieved from Internet on Dec. 7, 2018, 8 pages. <http://en.wikipedia.org/wiki/Levenshtein_distance>.
WikiPedia, "Radix tree", retrieved from the Internet on Dec. 7, 2018, 8 pages. <http://en.wikipedia.org/wiki/Compact_prefix_tree>.
X. Zhu, et al., "Activity Clustering for Online Anomaly Detection", Proceedings of the 2010 International Conference on Modelling, Identification and Control, Jul. 2010, pp. 842-847.

\* cited by examiner

Patterns

| | | May 05 May 12 May 19 May 26 Jun 02 Jun 09 Jun 16 Jun 23 Jun 30 Jul 07 Jul 14 Jul 21 Jul 28 |
|---|---|---|

500 ──▶

504 — Actions
Apply changes  [Apply]
Save this pattern as
Type of file name  [____]
                  [____▼]
☑ Enable pattern anomaly  [Publish]
Delete this pattern  [Delete]
Do nothing  [Cancel]

502 ─┐

Show [10 ▼] entries                                     Search: [____]

| Remove | Essential | Cluster | Log Message |
|--------|-----------|---------|-------------|
| ☐ | ☐ | 170 | |
| ☐ | ☐ | 171 | |
| ☐ | ☐ | 349 | |
| ☐ | ☐ | 350 | |
| ☐ | ☐ | 351 | |
| ☐ | ☐ | 525 | |
| ☐ | ☐ | 526 | |
| ☐ | ☐ | 840 | |
| ☐ | ☐ | 841 | |
| ☐ | ☐ | 842 | |

Showing 1 to 10 of 30 entries          ◀ Previous   Next ▶

FIG. 5

INTERACTIVE DETECTION OF SYSTEM ANOMALIES

BACKGROUND

Operations analytics are routinely performed on operations data. Operations analytics may include management of complex systems, infrastructure and devices. Complex and distributed data systems are monitored at regular intervals to maximize their performance, and detected anomalies are utilized to quickly resolve problems. In operations related to information technology, data analytics are used to understand log messages, and search for patterns and trends in telemetry signals that may have semantic operational meanings.

BRIEF DESCRIPTION OF THE DRAWINGS

FIG. 5 is an example of an analysis interface for event patterns.

DETAILED DESCRIPTION

Figure 1:
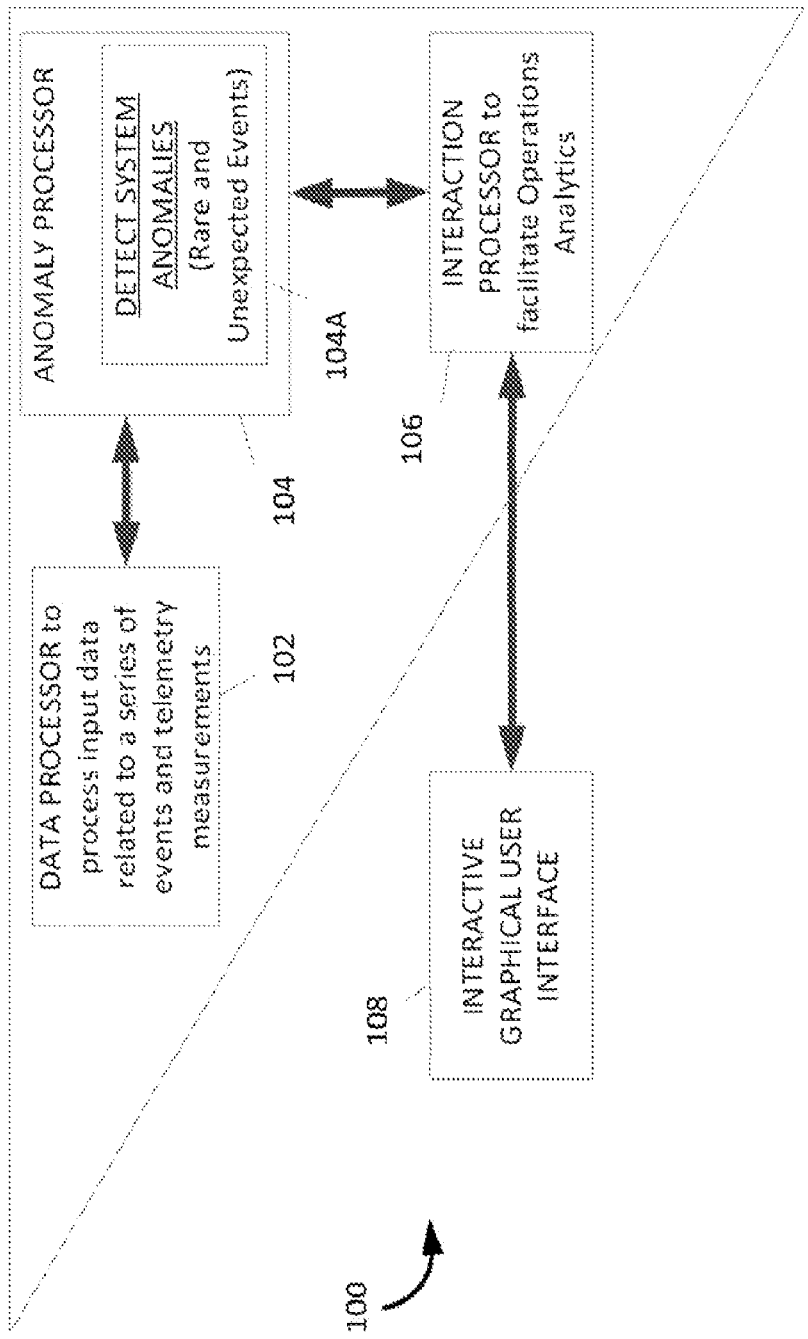
FIG. 1 is a functional block diagram illustrating an example of a system for interactive detection of system anomalies.

Operational analytics relates to analysis of operations data, related to, for example, events, logs, and so forth. Various performance metrics may be generated by the operational analytics, and operations management may be performed based on such performance metrics. Operations analytics is vastly important and spans management of complex systems, infrastructure and devices. It is also interesting because relevant analytics are generally limited to anomaly detection and pattern detection. The anomalies are generally related to operations insight, and patterns are indicative of underlying semantic processes that may serve as potential sources of significant semantic anomalies. Generally, analytics is used in IT operations ("ITO") for understanding unstructured log messages and for detecting patterns and trends in telemetry signals that may have semantic operational meanings. Many ITO analytic platforms focus on data collection and transformation, and on analytic execution.

However, operational analytics are generally query-based. For example, a domain expert, such as a system engineer, may query input data to extract and analyze data related to an aspect of system operations. In many situations, relevant data may be normalized and readily available to be uploaded onto a flexible and powerful analytic execution engine. However, questions or problems may need to be translated into appropriate analytic formulations in order to generate the desired responses.

In a big data scenario, the size of the volume of data often negatively impacts processing of such query-based analytics. One of the biggest problems in big data analysis is that of formulating the right query. Although it may be important to extract features and execute data analytics, this may not be sufficient to address the issues related to big data. Once data is available in an appropriate format, it becomes important to know what analyses may be most productive in providing operational insights. When datasets are small and experts are readily available, platforms connecting analytic tools to automatically collected data are generally very effective. However, as the data grows larger and experts become scarce, operational data mining becomes difficult; there may be just too much data and the relationships are too complex to formulate queries that may provide much needed insights. Accordingly, there may be an overwhelming need for tools that help formulate analytic queries.

Therefore, in the context of operational data, it may be important to provide an interface that may be utilized by operational investigations to easily formulate and solve operational issues. As disclosed in various examples herein, such an interface may be based on concatenations of pattern and anomaly detectors. In particular, interesting analytics may be highlighted, and relevant analytics may be suggested, independent of a query. An interactive ecosystem may be disclosed where new combinations of anomalies and patterns may compete for selection by a domain expert.

Generally, it may be difficult to define a set of anomaly and pattern detectors that may encompass all the detection that may be necessary for operational analytics. Additionally every significant set of detectors may initially have an overwhelming set of anomalies and patterns for the domain expert to investigate, validate, and/or disqualify. As disclosed herein, such issues may be addressed by using a limited, but generic, set of anomaly detectors and pattern recognition schemes, which may combine automatically so that input data related to a series of events and telemetry measurements may be enriched whenever an anomaly or pattern may be detected. Such feedback enables deep semantic explorations that may eventually encompass a large set of complex analytics. Furthermore, such feedback-based interaction constitutes a competitive ecosystem for prioritized analytics, where analytics compete for the attention of the domain expert, highlighting the analyses that are most likely to be relevant to the domain expert. Moreover, changes in operational performance are driven by changes in the underlying input data and by continuous interactions with domain experts. New data may manifest new anomalies and patterns, whereas new interactions with domain experts may introduce new tagged patterns and system anomalies.

As described in various examples herein, interactive detection of system anomalies is disclosed. One example is a system including a data processor, an anomaly processor, and an interaction processor. Input data related to a series of events and telemetry measurements is received by the data processor. The anomaly processor detects presence of a system anomaly in the input data, the system anomaly indicative of a rare situation that is distant from a norm of a distribution based on the series of events and telemetry measurements. The interaction processor is communicatively linked to the anomaly processor and to an interactive graphical user interface. The interaction processor displays, via the interactive graphical user interface, an output data stream based on the presence of the system anomaly, receives, from the interactive graphical user interface, feedback data associated with the output data stream, and provides the feedback data to the anomaly processor for operations analytics based on the feedback data.

Generally, the term "system anomaly" as used herein may correspond to a time-slot where multiple events/signals show collectively anomalous behavior through their combined anomaly measures. Alternatively the term "rare situation" may be used to emphasize a co-location in time. Both these terms may indicate some collective anomaly situation/behavior. Generally, the system anomaly of interest may appear on the graphical user interface and analysis may proceed without the user needing to enter a query. The analysis may begin by selection of the system anomaly, where the major sources of the system anomaly are prioritized—so that the highest contribution appears more prominently, and similar system anomalies are identified, thereby allowing for fast analysis that usually does not require any further search or data queries. The interface also enables filtering of input data using keywords. This may be useful for instances where the problem the user may be set to investigate does not seem to appear on the initial interface. It allows for the interaction described herein from a filtered subset of data. The interface also highlights keywords related to system anomalies as potential filter words as another means of highlighting system anomalies for the benefit of a user, such as, for example, a domain expert reviewing the system anomalies for operations analytics.

Generally, the feedback data need not be based on the same type of received system anomalies, i.e., at each iteration, a certain anomaly type (rarity, flood, etc.) may be added and/or removed from the set of the events. As described herein, a weighting may be utilized (e.g., weight 0 for removal of a certain anomaly type). The techniques described herein enable automatic detection of system anomalies without a query. However, such automatic detection techniques may be combined with known system anomalies, and/or query-based detection of system anomalies to form a hybrid system.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating an example of a system 100 for interactive detection of system anomalies. System 100 is shown to include a data processor 102, an anomaly processor 104, and an interaction processor 106.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth, Such a network may be, for example, part of a cellular network, part of the internet, part of an intranet, and/or any other type of network.

The components of system 100 may be computing resources, each including a suitable combination of a physical computing device, a virtual computing device, a network, software, a cloud infrastructure, a hybrid cloud infrastructure that includes a first cloud infrastructure and a second cloud infrastructure that is different from the first cloud infrastructure, and so forth. The components of system 100 may be a combination of hardware and programming for performing a designated function. In some instances, each component may include a processor and a memory, while programming code is stored on that memory and executable by a processor to perform a designated function.

The computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform an interactive detection of system anomalies. Computing device may include a processor and a computer-readable storage medium.

The system 100 receives input data related to a series of events and telemetry measurements. The system 100 detects presence of a system anomaly in the input data, the system anomaly indicative of a rare situation that is distant from a norm of a distribution based on the series of events and telemetry measurements. In some examples, the system 100 detects presence of an event pattern in the input data. The system 100 displays, via an interactive graphical user interface, an output data stream based on the presence of the system anomaly. The system 100 receives, from the interactive graphical user interface, feedback data associated with the output data stream, and provides the feedback data to the anomaly processor for operations analytics based on the feedback data.

In some examples, the data processor 102 receives input data related to a series of events and telemetry measurements. The series of events may be customer transactions, Web navigation logs (e.g. click stream), security logs, and/or DNA sequences. In some examples, each event may be associated with an event identifier identifying a given event in the series of events, an event time identifier identifying a time when the given event occurred. In some examples, the series of events may be defined based on temporal constraints. For example, the series of events may be a collection of log messages for a specified period of time. In some examples, the series of events may be defined based on spatial constraints. For example, the series of events may be a collection of log messages for a specified geographic location. Combinations of spatial and temporal constraints may be used as well. Also, for example, the series of events may be based on additional system identifiers, such as, for example, usage or any other identifier of a system. Generally, such system identifiers may not be uniform. For example, system anomalies may appear over differing time intervals, and/or different usage values. As described herein, system anomalies from such non-uniform system identifiers may be appropriately modified and/or scaled to be uniform, additive, and so forth, to determine, for example, an anomaly intensity, an anomaly score, an anomaly fingerprint, and a fingerprint matching function.

The input data may be normalized in several ways. For example, a log analysis, and/or a signal analysis may be performed on the input data. In some examples, data processor 102 may receive a normalized input data. In some examples, data processor 102 may perform operations to normalize the input data. In some examples, the input data may be a stream of log messages. Log messages may be analyzed for latent structure and transformed into a concise set of structured log message types and parameters. In some examples, each source of log messages may be pre-tagged. The input data may be a corresponding stream of event types according to matching regular expression. Log messages that do not match may define new regular expressions. In some examples, telemetry signals may also be analyzed for periodicities and relevant features. Generally, the event type is a type of log message or a type of performance metric.

The input data may be fed into analysis processors, such as, for example, an anomaly processor 104, In some examples, system 100 may include a pattern processor (not illustrated in FIG. 1). The anomaly processor 104 detects presence of a system anomaly 104A in the input data. In some examples, such detection may be automatic. In some examples, such detection may be query-based. In some examples, query-less detection of system anomalies may be combined with query-based techniques.

As described herein, a system anomaly 104A is an outlier in a statistical distribution of data elements of the input data. The term outlier, as used herein, may refer to a rare event, and/or an event that is distant from the norm of a distribution (e.g., an extreme, unexpected, and/or remarkable event). For example, the outlier may be identified as a data element that deviates from an expectation of a probability distribution by a threshold value. The distribution may be a probability distribution, such as, for example, uniform, quasi-uniform, normal, long-tailed, or heavy-tailed. Generally, the anomaly processor 104 may identify what may be "normal" (or non-extreme, expected, and/or unremarkable) in the distribution of clusters of events in the series of events, and may be able to select outliers that may be representative of rare situations that are distinctly different from the norm. Such situations are likely to be "interesting" system anomalies 104A. In some examples, system anomalies may be identified based on an expectation of a probability distribution. For example, a mean of a normal distribution may be the expectation, and a threshold deviation from this mean may be utilized to determine an outlier for this distribution.

In some examples, a system anomaly may be based on the domain. For example, the distribution may be based on the domain, and an expectation or mean of the distribution may be indicative of an expected event. A deviation from this mean may be indicative of a system anomaly. Also, for example, a system anomaly in log messages related to security, may be different from a system anomaly in log messages related to healthcare data. In some examples, a domain expert may provide feedback data that may enable automatic identification of system anomalies. For example, repeated selection of an event by a domain expert may be indicative of a system anomaly.

A domain may be an environment associated with the input data, and domain relevance may be semantic and/or contextual knowledge relevant to aspects of the domain. For example, the input data may be data related to customer transactions, and the domain may be a physical store where the customer transactions take place, and domain relevance may be items purchased at the physical store and the customer shopping behavior. As another example, the input data may be representative of Web navigation logs (e.g. click stream), and the domain may be the domain name servers that are visited via the navigation logs, and domain relevance may be analysis of Internet traffic. Also, for example, the input data may be related to operational or security logs, and the domain may be a secure office space for which the security logs are being maintained and/or managed, and domain relevance may be tracking security logs based on preferences such as location, time, frequency, error logs, warnings, and so forth.

Generally, a domain expert may be an individual in possession of domain knowledge. For example, the domain may be a retail store, and the domain expert may be the store manager. Also, for example, the domain may be a hospital, and the domain expert may be a member of the hospital management staff. As another example, the domain may be a casino, and the domain expert may be the casino manager. Also, for example, the domain may be a secure office space, and the domain expert may be a member of the security staff.

In some examples, the anomaly processor 104 may operate on a series of classified structured log messages $\{e_j\}$. Each log message or event may be associated with at least a time $t_j=t(e_j)$, and an event type $T_j=T(e_j)$. In some examples, the event type may be a signal, and each event may be associated with, in addition to time and event type, numerical values $V_{m,j}=v_m(e_j)$, where the numerical values associated with events of an event type $T_n$, $v_m(e_j|T(e_j)=T_n)$ may be attributed a signal type $T_{n,m}$. In some examples, the anomaly processor 104 may additionally operate on telemetry signals arriving in structured tabular form as a stream of discrete signal measurement events $\{e_l\}$ where each signal measurement may be associated with a time $t_l=t(e_l)$, a signal type $T_l=T(e_l)$ and a single numerical value $v_l=v(e_l)$.

In some examples, system 100 may include an evaluator (not shown in the figures) to determine various quantitative measurements related to the input data. Generally, the evaluator may determine measurements at different levels. For example, a first level measurement for anomaly intensity amounts may be determined for each event-type. Also, for example, a second level measurement may be a collective measurement based on anomaly types (e.g., Flood of Events, Rare Events, etc.). For example, the evaluator may determine an anomaly intensity, an anomaly intensity score, an anomaly fingerprint, and an anomaly fingerprint matching score for anomaly types. As another example, a third level measurement may be an aggregated measurement of an anomaly score for a system anomaly in a given time slot.

As described herein, a determination at each level may be based on a determination at a preceding level. For example, the anomaly intensity, the anomaly intensity score, the anomaly fingerprint, and the anomaly fingerprint matching score may be based on the anomaly intensity amounts. Likewise, the anomaly score may be based on the anomaly intensity, the anomaly intensity score, the anomaly fingerprint, the anomaly fingerprint matching score and the anomaly intensity amounts. As described herein, each measurement at each level may correspond to different distributions, different scales, different time-slots, and so forth. Accordingly, to meaningfully combine these measurements, they may need to be scaled and/or transformed to measurements that are comparable and additive, facilitating their respective combination, aggregation, comparison and/or matching. These and other aspects of detection of a system anomaly are described herein.

In some examples, the evaluator may determine anomaly intensity amounts $Q_k(\bar{t}_i,T_j)$ defined on discrete time-slots $\bar{t}_i$:

$t \in [t_0+i\Delta, t_0+(i+1)\Delta]$ for each event type and signal type $T_j$. In some examples, an anomaly intensity amount for events may be the event-count $n(T_j,\bar{t}_l)=\|T_j(\bar{t}_l)\|$. In some examples an anomaly intensity amount for events may be a function of the event count, such as the event-indicator $I(T_j,\bar{t}_l)=1$ if $n(T_j,\bar{t}_l)>0$ else 0, or the event-count log-scale $(T_j,\bar{t}_l)=1+\log_2 n(T_j,\bar{t}_l)$ if $n(T_j,\bar{t}_l)>0$ else 0. In some examples, an anomaly intensity amount for signals may be the maximal signal value per signal type per time slot $M(T_j,\bar{t}_l)=\max(v_j(t \in \bar{t}_l))$. In some examples, an anomaly intensity for signals may be the range of signal values per signal type per time slot $R(T_j,\bar{t}_l)=\max(v_j(t \in \bar{t}_l))-\min(v_j(t \in \bar{t}_l))$.

In some examples, the evaluator determines, for a time interval, the anomaly intensity for each anomaly type. As described herein, the anomaly intensities for each of the different anomaly types may be determined before they are transformed into anomaly scores via a "distinctive residual rarity" transformation. In some examples, the evaluator determines, for each time interval for an anomaly type, incomparable anomaly intensity amounts, wherein each incomparable anomaly intensity amount may be transformed with respect to the distribution of associated incomparable anomaly intensity amounts in reference time intervals, based on a distinctive residual rarity extremity score, into comparable, additive, and distinctive anomaly intensity amounts. Accordingly, incomparable anomaly intensities associated with different event types may be transformed into comparable, additive and distinctive anomaly intensities to determine an anomaly score. For example, the anomaly processor 104 may comprise K components, each component k associated with a specific anomaly type for a specific group of events and/or signals $G_k$, and applying a transformation of one or more anomaly intensities into anomaly intensity amounts $c_k(T_j,\bar{t}_l)$. Each such transformation may be designed such that anomaly intensity amounts corresponding to different event types within the reference group $G^k$ may share a common scale so they may be combined into anomaly intensities representative of event type or signal-type groups, and they may also be compared to determine the event types that are the main contributors to the anomaly intensity, for example, to aid in root-cause identification. As used herein, an anomaly intensity amount measures a contribution of a certain event type to an anomaly intensity.

In some examples, the anomaly processor 104 may receive a time-based stream of events or signals, and the evaluator may determine an anomaly intensity and an anomaly score for each given interval of time. In some examples, for a given time slot, the anomaly processor 104 may identify events that contribute to a majority of the anomaly intensity, and such identified events may be used as a fingerprint to identify similar system anomalies. In some examples, the evaluator may determine three anomaly-related quantities from the anomaly intensity amounts per time slot. In some examples, such determinations may be performed by each component k of the anomaly processor 104. The three anomaly-related quantities may be:

1) Anomaly intensity: An anomaly intensity may be determined based on:

$$x_k(\bar{t}_l)=\Phi_k(\Sigma_{T \in G^k} c_k^\alpha(T,\bar{t}_l)), \quad \text{(Eqn. 1)}$$

where each anomaly intensity amount may be raised to a power $\alpha$ associated with component k. In some cases $\alpha=1$ (simple addition). In some cases $\alpha=2$ (sum-of-squares) to emphasize the contribution of larger components relative to smaller components. In some examples, $\Phi_k$ may be an optional non-linear monotonic mapping selected to equalize differences between anomaly intensity amounts. In some examples, $\Phi_k$ may be chosen as the $\alpha$-root function, i.e. $\Phi_k(\gamma)=\sqrt[\alpha]{\gamma}$.

2) Anomaly score to assess an extremity of an anomaly intensity $x_k(\bar{t}_l)$ relative to the probability distribution of corresponding values in reference group of time-slots $\bar{t} \in G(\bar{t}_l)$: $\alpha_k(\bar{t}_l)=A(x_k(\bar{t}_l), f(x_k(\bar{t})))$. In some examples, a time-slot reference group may include a large contiguous time-span that may include relevant historical data relative to the particular time-slot (e.g. $G(\bar{t}_l)$ may include all time-slots $\bar{t}$ up to a specified number of days before $\bar{t}_l$). In some examples, a time-slot reference group may correspond to a periodic set of time-slots sharing same time-of-day and day-of-week. Use of such periodic reference groups may be a realization of base-lining for seasonality of work-loads and work-patterns of the system under analysis. In some examples, a time-slot reference group may be based on a geographical area. In some examples, a time-slot reference group may be based on the domain. The anomaly scoring function A may be designed to be additive with unified scales for anomaly scores of different components, so that by adding up the component anomaly scores: $\alpha(\bar{t}_l)=\Sigma_k \alpha_k(\bar{t}_l)$, the resulting total anomaly score may be meaningful. For example, anomaly intensities corresponding to different anomaly types may be transformed into normalized and comparable anomaly scores per anomaly type with respect to the time-slot reference group. As described herein, the transformation may be based on a distribution of related anomaly intensities, and may be based on base lining (e.g., periodic time-slot reference groups) and history spans (e.g., system anomalies with respect to last day, last week, etc.). In some examples, as described herein, the evaluator determines, for the time interval, anomaly intensities and the anomaly score, and each anomaly intensity may be transformed, with respect to the distribution of anomaly intensities of the same anomaly type in reference time-slots, based on a distinctive residual rarity extremity score, into comparable, additive, and distinctive anomaly intensity scores, that may in turn be combined to determine the anomaly score.

3) Anomaly Fingerprint per time-slot specifying the identity and relative contributions of event types to the anomaly intensity at time-slot $\bar{t}_l$ may be determined as:

$$F_k(\bar{t}_l)=\{T_j,\rho_j^k(t_i)\}_{j \in J_l}, \quad \text{(Eqn. 2)}$$

where the relative contribution may be defined as $\rho_j^k(t_i)=c_k^\alpha(T_j,\bar{t}_l)/\Sigma_{T \in G^k} c_k^\alpha(T,\bar{t}_l)$, and top contributing event types may be selected such that the sum of their relative contributions may be starting with larger contributions first, may be the minimum that exceeds a threshold close to 100%, for example 95%. Generally, each event type in each time-slot may be associated with an anomaly intensity amount for each anomaly type. The anomaly fingerprint may then be based on the anomaly intensity amounts for different event types. In some examples, this may be achieved via a vector of anomaly intensity amounts in time-slots different from the selected time-slot. As described herein, anomaly intensities may be determined by combining comparable anomaly intensity amounts for each event type, and such comparable anomaly intensity amounts for different event types may be combined to determine an anomaly intensity and an anomaly fingerprint.

4) Fingerprint matching functions: determined for a subset of time slots $t^*$ that may be considered to be interesting (either by user selection or by their relatively higher anomaly scores). For each such time slot $\bar{t}^*$ the fingerprint matching function may be determined as:

$$\alpha_{k|t^*}(\bar{t}_l) = \Phi_k(\Sigma_{T_j \in G^k} c_k^\alpha(T_j, \bar{t}_l) \cdot \rho_j^k(\bar{t}^*)), \quad \text{(Eqn. 3)}$$

such that for each time-slot $\bar{t}_l$ the fingerprint matching score may be high only if anomaly intensity amounts corresponding to top contributing event types in the fingerprint are high.

In some examples, as described herein, the anomaly type may include a Flood of Events, wherein the anomaly intensity amount is an event count, a Variety of Events, wherein the anomaly intensity amount is an event occurrence indicator, a Flood of Rare Events, wherein the anomaly intensity amount is a product of an event count extremity factor, and an event-type rarity factor, and a Flood of Extreme Signals, wherein the anomaly intensity amount is a maximal signal value per time interval transformed based on a distinctive residual rarity extremity score.

In some examples, the anomaly type may be a Partial Pattern. The Partial Pattern anomaly type may be characterized by multiple events appearing repeatedly in the same time slot. For example, a set of 30 events may be identified in the selected time slot, where each event corresponds to a service shutdown message and/or alert. Generally, the Partial Pattern anomaly type may be detected based on interactions with a domain expert via the interactive graphical user interface 108.

In some examples, the anomaly processor 104 may include a component evaluating Flood of Events ("FoE") anomaly type, where the anomaly intensity amount may be the occurrence-count of event type $T_j$ in time slot $t_i$, $c_{FoE}(T_j, \bar{t}_l) = n(T_j, \bar{t}_l)$, and power-law may be $\alpha = 1$ (regular sum), so that the anomaly intensity may be $x_{FoE}(\bar{t}_l) = n_{T \in G}(\bar{t}_l)$. The anomaly-fingerprint components are the relative frequencies of the different events $\rho_j^k(t_i) = n(T_j, \bar{t}_l)/n_{T \in G}(\bar{t}_l)$ in each time-slot.

In some examples, the anomaly processor 104 may include a component evaluating Variety of Events ("VoE") anomaly type, where the anomaly intensity amount may be the event-indicator $c_{FoE}(T_j, \bar{t}_l) = I(T_j, \bar{t}_l)$ equal to 1 for each event j that appeared at least once in at time slot $t_i$ so that the sum of anomaly intensity amount may be just the number of distinct event types that occurred in time slot $t_i$. $N(T \in \bar{t}_l)$. The anomaly intensity may be $x_{VoE}(\bar{t}_l) = N(T \in \bar{t}_l)$, and anomaly-fingerprint components are equal to $1/N(T \in \bar{t}_l)$ for all event types that appeared in time slot $\bar{t}_l$ and 0 otherwise.

In some examples, the anomaly processor 104 may include a component evaluating a Flood of Rare Events ("RE") anomaly type. The RE anomaly intensity amount for each event type $T_j$ that appears in a certain time slot $\bar{t}_l$, may be designed to be large if $T_j$ is rare relative to other events in the time-slot reference group $\bar{t} \in G(\bar{t}_l)$. In some examples, an event type rarity factor may be computed as the negative log of the occurrence-probability of event type $T_j$ in the reference group of time-slots $G(\bar{t}_l)$, in the reference group of event types $G(T_j:r(T_j,\bar{t}_l) = -\log_2 (P(T_j,\bar{t}_l))$, where $P(T_j, \bar{t}_l) = \|T_j\|_{l \in G}(\bar{t}_l)/\|G(T_j)\|_{l \in G}(\bar{t}_l)$. Furthermore, the RE anomaly intensity amount may be designed to be large if the count of an event $T_j$ at time-slot $\bar{t}_l$ is high relative to the counts of that event type in other time-slots in reference group $\bar{t} \in G(\bar{t}_l)$, so that e.g. a rare event that occurs several times in a single time-slot may contribute a larger RE anomaly intensity amount than the same event occurring once in a time slot. In some examples, an event-count extremity factor may be computed as the occurrence-probability of event type $T_j$ in time-slot $t_i$ relative to the reference group of time-slots $G(\bar{t}_l):h(T_j,\bar{t}_l) = n(T_j,\bar{t}_l)/\Sigma_{T \in G}(\bar{t}_l) n(T_j,\bar{t}_l)$. Event-count extremity factors tend to be relatively high for rare events in the time-slots they appear in, and relatively low for frequent events in any time slot, which keeps the RE anomaly intensity amounts corresponding to frequent events low in all time-slots. In some cases, the RE anomaly intensity amount may be expressed as a product of the event type rarity factor and the event-count extremity factor $c_{RE}(T_j, \bar{t}_l) = r(T_j, \bar{t}_l) \cdot h(T_j, \bar{t}_l)$. Since the RE anomaly intensity amount may be already given in the log-domain, and the event-count extremity factor may be typically much smaller than 1, the sum of RE anomaly intensity amounts over all events may tend to be small. In some case, an exponential non-linear mapping $\Phi_{RE}(\gamma) = 2^\gamma$ may be applied to the sum, to emphasize relatively large score, and to transform the anomaly intensities to similar ranges as the other anomaly components.

In some examples, G(.) or $c_{RE}$ (.,.) maybe normalized compared to a baseline of a system, such as, for example, a value based on historical data and/or feedback data. Accordingly, G(.)=G(.)–hist (G), where hist (G) denotes the value based on historical data and/or feedback data. For example, the feedback data may be indicative of cropping of system anomalies below a threshold to zero. Also, for example, feedback data may be indicative of bucketing all system anomalies above another threshold to amplified values.

In some examples, the anomaly processor 104 may include components to evaluate signal related anomaly types. Unlike event-counts that have a common scale for all types of events, different signal types may have incomparable scales, so their anomaly intensities, like range or maximum within each time-slot, may not be used as anomaly intensity amounts, as there may be no meaning in adding quantities not defined on the same scale. Instead a generic transformation may be applied to transform an anomaly intensity into a value-extremity score, such that value-extremity scores corresponding to signals with significantly different types of distribution, and scale may be comparable and additive so they may be used as anomaly intensity amounts to compute a meaningful anomaly intensity, and an anomaly fingerprint. Furthermore, such additive value-extremity scores may be applied to the anomaly intensity to generate anomaly scores that are comparable and additive across anomaly types.

A value-extremity score may be expected to be high only for extreme values (outliers), which may be residually rare (very small percentage of the values are equal or above an extreme value), and well separated from the non-extreme majority of values (the inliers), One value-extremity score in the case of normally distributed values, may be the "Z-score" obtained by subtracting the distribution-mean from the value and dividing it by the distribution standard deviation a. However, each of the anomaly intensities may follow a different type of distribution including quasi-uniform, normal, long-tailed, or heavy-tailed. The Z-score may not work as well for non-normal distributions.

Figure 2:
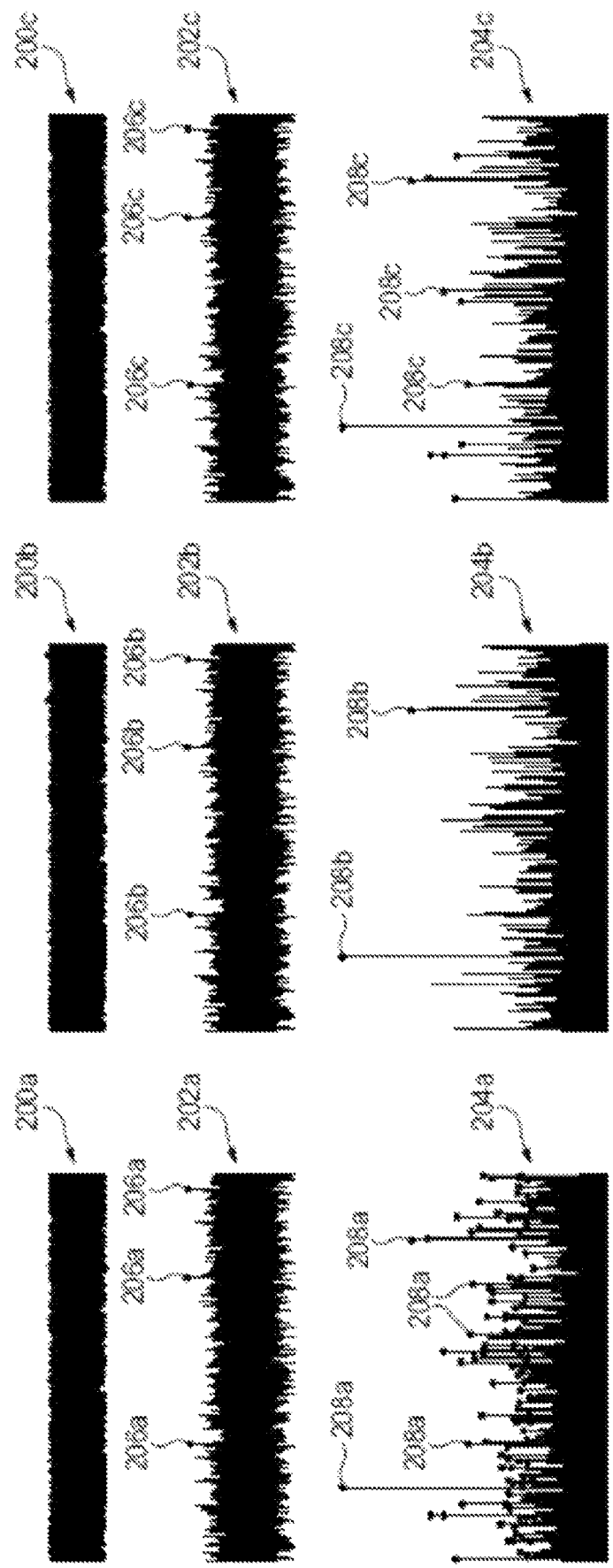
FIG. 2A illustrates an example of hypothetical anomaly intensities distributed uniformly, normally, and with a long-tailed Weibull distribution.
FIG. 2B illustrates an example of resultant unsatisfactory outliers obtained after a residual rarity transformation of the anomaly intensities illustrated in FIG. 2A.
FIG. 2C illustrates an example of resultant outliers based on a modified distinctive residual rarity anomaly transform.

FIG. 2A illustrates an example of hypothetical anomaly intensities distributed uniformly 200a, normally 202a, and with a long-tailed Weibull distribution 204a. Dots whose Z-score may be above 3 (at least 3σ above the mean) are highlighted. This may capture correctly extreme-values in the uniform and normal distributions. For example three points with high extreme-value score 206a are illustrated for the case of normal distribution, and no points with high extreme-value score are found in the case of uniform distribution. However, a relatively large number of values 208a get high Z-score in the case of heavy tailed distribution, which defies the requirement for residual rarity of extreme values.

Another value-extremity score which may work well for long-tailed and heavy-tailed distribution may be the residual rarity of a value measured as the negative log of the probability of other values to be equal or higher—this probability may be associated with the complementary cumulative distribution function (CCDF) $\bar{F}$ known in the statistical literature:

$$R(Q(\bar{t_i})) = -\log_2 P(Q(\bar{t} \in G(\bar{t_i})) \geq Q(\bar{t_i})) = -\log_2 \bar{F}_{\bar{t} \in G(\bar{t_i})}(Q(\bar{t_i})) \quad \text{(Eqn. 4)}.$$

The CCDF, like any function measuring probabilities, has an important property that when applied to joint value distributions (originating from multiple signals), the distribution function may be expressed as a product of the individual value distributions, provided the signals are statistically independent. Accordingly, the log of the joint probability for independent signals may be expressed by the sum of the logs of the individual signal distributions. In other words, the residual-rarity score of a multiple-signal set corresponds to the sum of individual residual-rarity scores for independent signals. Accordingly, CCDF-based value-extremity scores (referred to herein as residual rarity extremity scores) are comparable and additive as required.

In some examples, the residual rarity extremity scores may be equivalent to 'top-p %' detection and may have no regard to value separation criteria. Accordingly, it may attribute high scores to top values even if they are not well separated from lower values, like in uniform distributions. To avoid false detections of outliers for uniform distributions, an outlier-detection threshold to match the detection rate of Z-scores for normal distributions may be designed. However, such a technique may still leave several false outlier detections in uniform distributions, and too few true-outlier detections for long-tail distributions.

FIG. 2B illustrates an example of resultant unsatisfactory outliers obtained after a residual rarity transformation of the anomaly intensities illustrated in FIG. 2A. For example, resultant unsatisfactory outliers obtained via the residual rarity extremity score applied to the anomaly intensities illustrated in FIG. 2A are illustrated. Hypothetical anomaly intensities distributed uniformly 200$b$, normally 202$b$, and with a long-tailed Weibull distribution 204$b$. As illustrated, although the outliers 206$b$ are consistent with the outliers 206$a$ for the normal distribution 202$b$, the outliers 208$b$ for the long-tailed Weibull distribution 204$b$ are minimal, and there are two false outliers detected for the uniform distribution in 200$b$.

To obtain a value-extremity score (an outlier criterion) that works well for a wide range of value distributions, and that may be comparable and additive and may address both the residual rarity and the separation criteria required from outliers, the residual rarity extremity scores may be modified to determine a "scaled CCDF", referred to herein as a distinctive residual rarity extremity score. Assuming that for operations data, all anomaly intensities are non-negative (as is the case for event-counts and telemetry signal values), and that separation criteria should be relative to the value-scale of each signal, the distinctive residual rarity extremity score may be defined by a minimal ratio S between outlier and inlier values, where S may be larger than 1. The extremity score with separation factor S may be:

$$E_S(Q(\bar{t_i})) = \quad \text{(Eqn. 5)}$$

-continued $$-\log_2 P\left(Q(\bar{t} \in G(\bar{t_i})) \geq \frac{Q(\bar{t_i})}{S}\right) = -\log_2 \bar{F}_{\bar{t} \in G(\bar{t_i})}(Q(\bar{t_i})/S).$$

In some examples, a single value of separation factor S may be used in computing value-extremity scores for all anomaly intensities, since separation criterion by ratio may be scale-independent and may apply similarly to signals or intensities at all scales.

FIG. 2C illustrates an example of resultant outliers based on a modified distinctive residual rarity anomaly transform. For example, an example of resultant outliers based on the distinctive residual rarity extremity score with separation factor S=1.2 (i.e. at least 20% separation) is illustrated. Hypothetical anomaly intensities may be distributed uniformly 200$c$, normally 202$c$, and with a long-tailed Weibull distribution 204$c$. As expected, there are no outliers in the uniform distribution, and for the same three outliers 206$c$ in the normal distribution 202$c$, a larger but limited set of outliers 208$c$ may be realized for the Weibull samples 204$c$.

In some examples, anomaly intensities may be transformed into anomaly scores that are comparable, additive and distinctive. The term "distinctive" as used herein refers to a requirement of a threshold separation between high values and lower values to be considered extreme. In some examples, the evaluator determines, for the time interval, anomaly intensities and the anomaly score, and where incomparable anomaly intensities are transformed, based on a distinctive residual rarity extremity score, into comparable, additive, and distinctive signals to determine the anomaly score. For example, the evaluator may include a component evaluating Extreme Signal ("ES") anomaly type, where the anomaly intensity amount for signal-type $T_l$ in time slot $t_i$ may be a distinctive residual rarity extremity score:

$$c_{ES}(T_j, \bar{t_i}) = \quad \text{(Eqn. 6)}$$

$$E_S(M(T_i, \bar{t_i})) = -\log_2 P\left(M(T_i, \bar{t} \in G(\bar{t_i})) \geq \frac{M(T_i, \bar{t_i})}{S}\right)$$

corresponding to the maximal signal value per signal type $T_l$ per time slot $M(T_l, \bar{t_i}) = \max(v_l(t \in \bar{t_i}))$. In some cases the separation factor S may be 1.2. In some examples the anomaly intensity may be computed according to Eq. 1, with power law $\alpha=2$ (sum-of-squares), and a mapping function of $\Phi_{ES}(\gamma) = \sqrt{\gamma}$, such that signals with values in $\bar{t_i}$ that have high value-extremity scores may be further emphasized relative to signals with lower value-extremity scores.

In some cases, the anomaly processor 104, may attribute an anomaly score to each anomaly component k in each time-slot $\bar{t_i}$ by assessing the extremity of an anomaly intensity $x_k(\bar{t_i})$ relative to the probability distribution of corresponding values in reference group of time-slots $\bar{t} \in G(\bar{t_i})$, using the distinctive residual rarity extremity score:

$$A_k(\bar{t_i}) = E_S(x_k(\bar{t_i})) = -\log_2 P\left(x_k(\bar{t} \in G(\bar{t_i})) \geq \frac{x_k(\bar{t_i})}{S}\right). \quad \text{(Eqn. 7)}$$

In some cases the separation factor used for all anomaly components may be S=2. With this extremity measure, anomaly scores for different anomaly components associated with different anomaly intensities have a common scale and may be compared and combined by addition, while at the same time maintaining the separation criterion required for them to be considered extreme in the first place. Accordingly, anomaly scores of different anomaly components may be added into a total system anomaly score as follows:

$$A(\overline{t_i}) = \Sigma_K \omega_k \cdot A_k(\overline{t_i}) \qquad \text{(Eqn. 8)}$$

where weights $\omega_k$ may be adjusted to reflect current relative importance of anomaly component k, determined heuristically based on domain expert interaction data received via an interaction processor 106.

Whereas event anomalies are generally related to insight into operational data, event patterns indicate underlying semantic processes that may serve as potential sources of significant semantic anomalies. As disclosed herein, an interaction processor 106 may be provided that allows operational analysis to be formulated as concatenations of pattern and anomaly detectors.

In some examples, system 100 may include a pattern processor to detect presence of an event pattern in the input data. Although the pattern processor may be described herein as a separate component, in some examples, the functions of the pattern processor may be performed by the anomaly processor 104. Generally, the pattern processor identifies non-coincidental situations, usually events occurring simultaneously, Patterns may be characterized by their unlikely random reappearance. For example, a single co-occurrence in 100 may be somewhat likely, but 90 co-occurrences in 100 may be much less likely to occur randomly.

In some examples, interaction processor 106 may be communicatively linked to the anomaly processor 104 and to an interactive graphical user interface 108. The interaction processor 106 displays, via the interactive graphical user interface 108, an output data stream based on the presence of the system anomaly. In some examples, interaction processor 106 may generate an output data stream based on the presence of the system anomaly and the event pattern. In some examples, the interaction processor 106 receives feedback data associated with the output data stream from the interactive graphical user interface 108, and provides the feedback data to the anomaly processor 104 and/or the pattern processor for operations analytics based on the feedback data. As described herein, feedback data may include feedback related to domain relevance, received via the interactive graphical user interface 108 and processed by the interaction processor 106. The feedback data may be indicative of selection or non-selection of a portion of the interactive graphical user interface 108. As used herein, selection may include copying a portion of text and/or images displayed by the interactive graphical user interface 108, selection or non-selection of a selectable menu, hovering over, or clicking on a text and/or image displayed, or touching a touch-sensitive portion of the interactive graphical user interface 108.

The interaction processor 106 processes the feedback data and supports interaction between the interactive graphical user interface 108 and a domain expert. Operations analytics, as used herein, may include any analytics associated with system performance. For example, operations analytics may include analysis of interesting patterns and incorporation of domain knowledge in the form of constraints into the detection of system anomalies. For example, the domain may be a retail store, and the domain knowledge may include knowledge about traffic patterns in the store, customer purchases, product placement, products sold, available inventory, clientele, store hours, and so forth. In some examples, the interaction processor 106 provides, via the interactive graphical user interface 108, an interactive visual representation of the system anomalies and event patterns. For example, to enable the domain expert to better understand and discover patterns, interaction processor 106 may provide a context-augmented interface for visually guided exploration.

In some examples, operations analytics may include tagging of system anomalies and event patterns. In some examples, operations analytics may include identifying anomaly types and initiating system responses based on the identified anomaly types. In some examples, operations analytics may include adding and/or removing an anomaly type from the output data stream. In some examples, operations analytics may include an actionable response such as generating a system alert. For example, the anomaly processor 104 may identify an issue and trigger a system alert to act on the issue promptly. In some examples, such an alert may be based on a fingerprint of a past system anomaly that was identified, tagged, and associated with a preferred mitigation or remediation action. For example, a past anomaly may be associated with a service shutdown based on a Partial Pattern anomaly type, and the anomaly processor 104 may trigger a system alert for a service shutdown. Also, for example, the Partial Pattern anomaly type may be detected based on interactions with a domain expert via the interactive graphical user interface 108, and a forced shutdown message may be generated by the anomaly processor 104.

In some examples, the interaction processor 106 may display a detected system anomaly, and may identify selection of the system anomaly by a domain expert. In some examples, the anomaly processor 104 may identify an anomaly type associated with the system anomaly, and the interaction processor 106 may display the anomaly type via the interactive graphical user interface 108. In some examples, the interaction processor 106 may identify interaction based on the system anomaly. For example, the domain expert may add or delete the system anomaly. Also, for example, the domain expert may select a word on a displayed word cloud to further investigate additional system anomalies similar to the selected system anomaly. In some examples, the anomaly processor 104 may determine an anomaly fingerprint for the selected pattern, determine a fingerprint matching function associated with the selected system anomaly, and detect additional system anomalies based on the fingerprint matching function.

As illustrated in FIG. 1, the interactive graphical user interface 108 may be communicatively linked to the anomaly processor 104 via the interaction processor 106. Accordingly, the interactive graphical user interface 108 supports the anomaly processor 104 and/or a pattern processor. In some examples, the interactive graphical user interface 108 displays the output data stream, including a first selectable option associated with the system anomaly, and a second selectable option associated with the event pattern. Accordingly, the interactive graphical user interface 108 displays system anomalies and event patterns, and provides suitable interfaces, such as the first selectable option associated with the system anomaly, and the second selectable option associated with the event pattern for the domain expert to identify and tag significant system anomalies. The interactive graphical user interface 108 receives such feedback data associated with the first and second selectable options and provides the feedback data to the interaction processor 106. In some examples, the interactive graphical user interface 108 provides the feedback data back into the anomaly processor 104 and/or the pattern processor via the interaction processor 106.

In some examples, the interactive graphical user interface 108 further provides, in response to a selection of the first selectable option, a pop-up card with information related to the system anomaly. Generally, the feedback data need not be based on the same type of received system anomalies, i.e., at each iteration, a certain anomaly type (RE, FoE, etc.) may be added and/or removed from the set of the events. As described herein, a weighting may be utilized (e.g., weight 0 for removal of a certain anomaly type).

Figure 3:
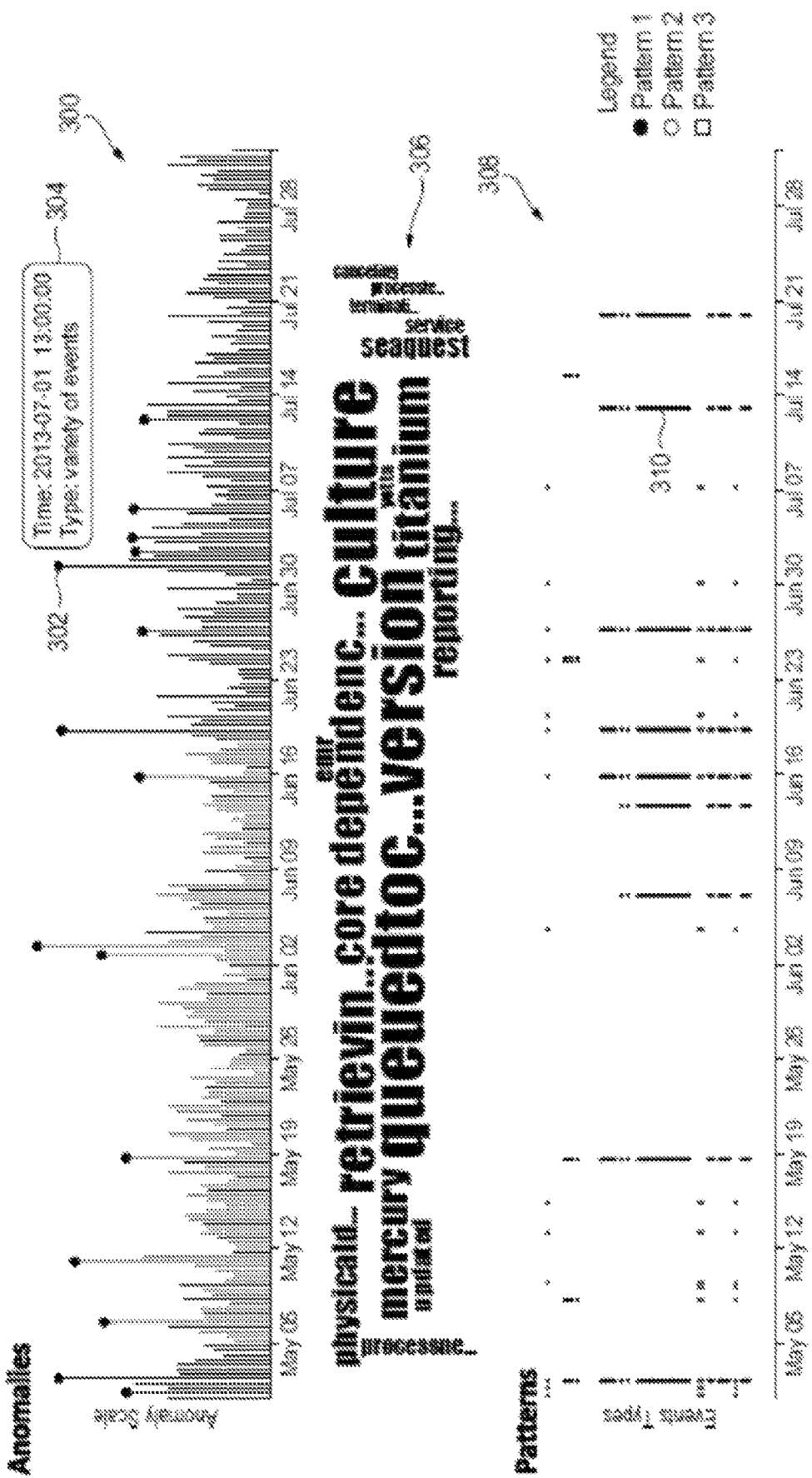
FIG. 3 is an example display of an output data stream including a word cloud.

FIG. 3 is an example display of an output data stream including a word cloud. A word cloud is a visual representation of a plurality of words highlighting words based on a relevance of the word in a given context. For example, a word cloud may comprise words that appear in log messages associated with the selected system anomaly. Words in the word cloud may be associated with term scores that may be determined based on, for example, relevance and/or position of a word in the log messages. In some examples, the word cloud may be interactive, and a system anomaly may be identified based on an interaction with the word cloud. For example, a term in the word cloud may be selected, and the interaction processor 106 may identify system anomalies that are associated with log messages that include the selected term.

In some examples, the example display of the output stream may be a snapshot of an application launcher interface provided via the interactive graphical user interface 108. The output data illustrated relates to an input data of log messages received during an example time period including May 5 to July 31, represented by the x-axis of the graphical representation. System anomalies 300 are illustrated, along with a word cloud 306 and event patterns 308. In some examples, a composite anomaly score may be displayed, where the composite anomaly score may be determined as a sum of several different anomaly scores. The first selectable option associated with the system anomaly may be, for example, a clickable node, such as node 302. Every highlighted node on the graph, such as, for example, node 302, may be clickable. Selection of the first selectable option, such as a node, may launch an analysis of the associated system anomaly. For example, clicking node 302 may launch an analysis of the system anomaly that occurred at or about July 1. As described herein, a selection may include a click, or may include hovering over node 302 in a touch-sensitive interactive display.

In some examples, the feedback data may include an indication of a selection of a system anomaly, and the graphical user interface 108 further provides, based on the feedback data, a pop-up card with information related to the selected system anomaly. For example, referring again to FIG. 3, in response to a selection of the first selectable option, a pop-up card with information related to the system anomaly may be displayed. For example, pop-up 304 may be displayed, with information related to the system anomaly. Pop-up 340 may include, for example, a date and time associated with the system anomaly, and a type of anomaly score for the system anomaly. For example, as indicated in FIG. 3, the selected system anomaly occurred on "2013-07-01" at "13:00:00". Also, for example, the anomaly type may be indicated as "Variety of Events".

In some examples, the anomaly processor 104 further generates a word cloud to be displayed via the interactive graphical user interface 108, the word cloud highlighting words that appear in log messages associated with the selected system anomaly. Highlighting may be achieved via a distinctive font, font size, color, and so forth. In some examples, term scores may be determined for key terms, the term scores based on a modified inverse domain frequency. In some examples, the modified inverse domain frequency may be based on an information gain or a Kullback-Liebler Divergence.

For example, referring again to FIG. 3, word cloud 306 highlights words that appear in anomalous messages more than in the rest of the messages. In some examples, relevance of a word may be illustrated by its relative font size in the word cloud 306. For example, "queuedtoc", "version", and "culture" are displayed in relatively larger font compared to the font for the other words. Accordingly, it may be readily perceived that the words "queuedtoc", "version", and "culture" appear in the messages related to the system anomaly more than in other messages. Event patterns 308 are displayed. In some examples, event pattern 308 may represent groups of events (or event groups) that appear almost exclusively together in the input data.

In some examples, the anomaly processor 104 may detect system anomalies based on at least one of the feedback data and a previously processed event pattern. In some examples, the evaluator may determine, for a time interval, the anomaly fingerprint based on a set of relative contributions of event types to the anomaly intensity; where a fingerprint matching score for the anomaly fingerprint may be computed in a second time interval to determine presence or absence of similar system anomalies in the second time interval, and where the fingerprint matching score may be computed based on a correlation between the anomaly fingerprint and anomaly intensity amounts in the second time interval.

For example, the anomaly processor 104 may identify an issue and trigger an alert to act on it promptly based on the fingerprint of a past system anomaly that was identified, tagged, and associated to a preferred mitigation or remediation action. The identification may be done by detecting other events that match the tagged fingerprint sufficiently well. Tagged system anomalies may increase the importance of their respective anomaly score, and deleted system anomalies may reduce the respective anomaly score.

Referring to FIG. 1, in some examples, the interactive graphical user interface 108 further provides, in response to a selection of the first selectable option, an analysis interface to analyze the system anomaly. In some examples, the analysis interface may be an interactive anomaly analysis interface. In some examples, the analysis interface may be generated by the anomaly processor 104. For example, in response to a click on a system anomaly, the interaction processor 106 may prompt the interactive graphical user interface 108 to open an analysis interface. In some examples, interaction processor 106 may receive feedback data indicative of a domain expert's interaction with the interactive graphical user interface 108 and provide the feedback data to the anomaly processor 104 to generate and/or modify an analysis interface. For example, the domain expert may examine the system anomaly and perhaps tag it, indicating its underlying cause. Tagging the system anomaly may catalogue an anomaly fingerprint as a known event.

Figure 4:
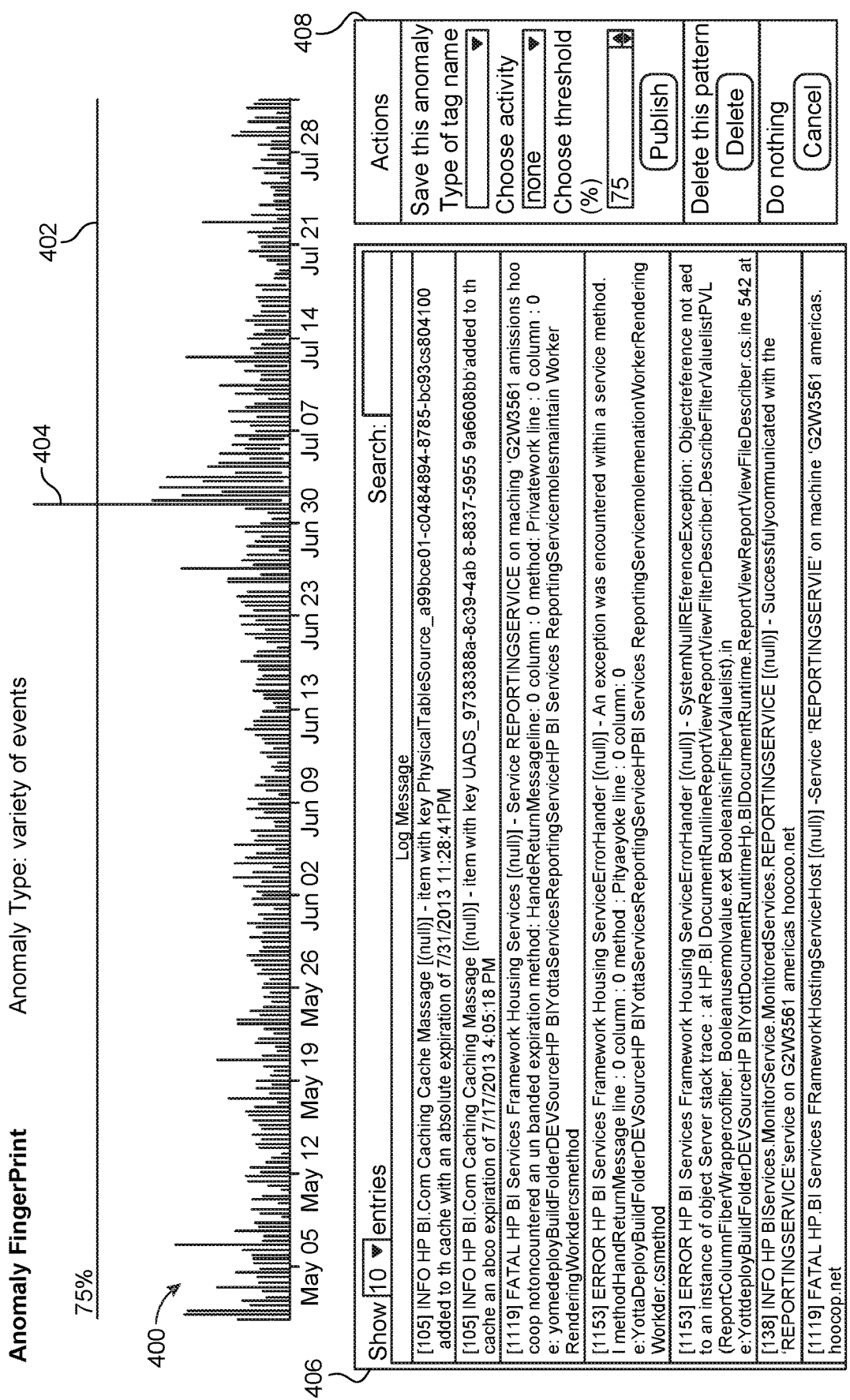
FIG. 4 is an example of an analysis interface for system anomalies.

FIG. 4 is an example of an analysis interface for system anomalies. A snapshot of the analysis interface triggered by selection of the system anomaly under the cursor in FIG. 3 is illustrated. A threshold anomaly score may be utilized to filter system anomalies of interest. For example, a threshold 402 of 75% may be utilized. In some examples, an actionable menu 408 may be provided to receive input from a domain expert. The actionable menu 408 may provide data entry fields and/or drop-down menus, to "Save this anomaly", "choose a severity", "Delete this Pattern", "Do Nothing", and so forth. For example, an entry of "75%" may be entered as a threshold value. System anomaly list 406 may be a set of events constituting the fingerprint as in Eqn. 2 corresponding to the system anomaly associated with node 302 in FIG. 3. Based on selection of node 302, the anomaly processor 104 may generate an anomaly fingerprint 406. In some examples, the feedback data from a domain expert may indicate that the fingerprint 406 represents an instance of "Rogue Report". That is, the underlying cause of the fingerprint 406, and by association node 302, may be that the transmission of a very complex report may be holding up data traffic and blocking efficient rendering of system resources. The top portion of FIG. 4 illustrates the fingerprint matching score from Eqn. 3 as a function of time. As illustrated, the system anomaly 404 matches the fingerprint perfectly, as expected. There may be other times where the fingerprint match may be high, but not sufficiently high for automatic recognition. Tagging the system anomaly 404 may indicate that the anomaly fingerprint may be stored and any future event that matches the anomaly fingerprint sufficiently well may be associated with the same tag and identified as a system anomaly.

In some examples, the anomaly processor 104 generates an interactive analysis interface to be provided via the interactive graphical user interface 108, and the anomaly processor 104 modifies the output data stream based on interactions with the analysis interface. In some examples, the interaction processor 106 detects, based on the interactions with the interactive graphical user interface 108, a Partial Pattern anomaly type. In some examples, the interaction processor 106 detects, based on the interactions with the analysis interface, a Partial Pattern anomaly type. In some examples, the interaction processor 106 displays, in the modified output data stream, a service shutdown message with the detected Partial Pattern anomaly type.

Referring to FIG. 1, in some examples, the interactive graphical user interface 108 further provides, in response to a selection of the second selectable option, an analysis interface to analyze the event pattern. For example, in response to an entry in the actionable menu 408, the interaction processor 106 may prompt the interactive graphical user interface 108 to provide an analysis interface. In some examples, interaction processor 106 may receive feedback data indicative of a domain expert's interaction with the interactive graphical user interface 108. For example, the domain expert may examine the event pattern, and perhaps tag it, indicating its underlying cause. Tagging the event pattern may catalogue them as a known event pattern.

FIG. 5 is an example of an analysis interface for event patterns. In some examples, the anomaly processor 104 may generate the analysis interface to analyze system anomalies. In some examples, the pattern processor may generate the analysis interface to analyze event patterns. In some examples, a snapshot of the analysis interface may be displayed in response to a selection of the second selectable option, such as, for example, clicking a first pattern 310 illustrated in FIG. 3. Event patterns 500 are shown in the output data stream. Actionable menu 504 is shown including second selectable options. For example, a menu button may be provided to "Apply" changes, name and "Save this pattern", select severity of a pattern, a clickable option to "Enable pattern anomaly", "Delete this pattern", and "Do nothing". For example, the selected pattern represents an anomaly type, Partial Pattern, characterized by multiple events (e.g., set of 30) appearing repeatedly in the same time slot. The selected pattern may be detected as this coincidence may not be likely to be random. The bottom of the pattern investigation interface lists the pattern events 502. The list of pattern events 502 may indicate, for example, that the 30 events likely correspond to a 'service shutdown' event. In some examples, tagging the pattern as "Service Shutdown" may automatically trigger an anomaly type, "Partial Pattern".

Figure 6:
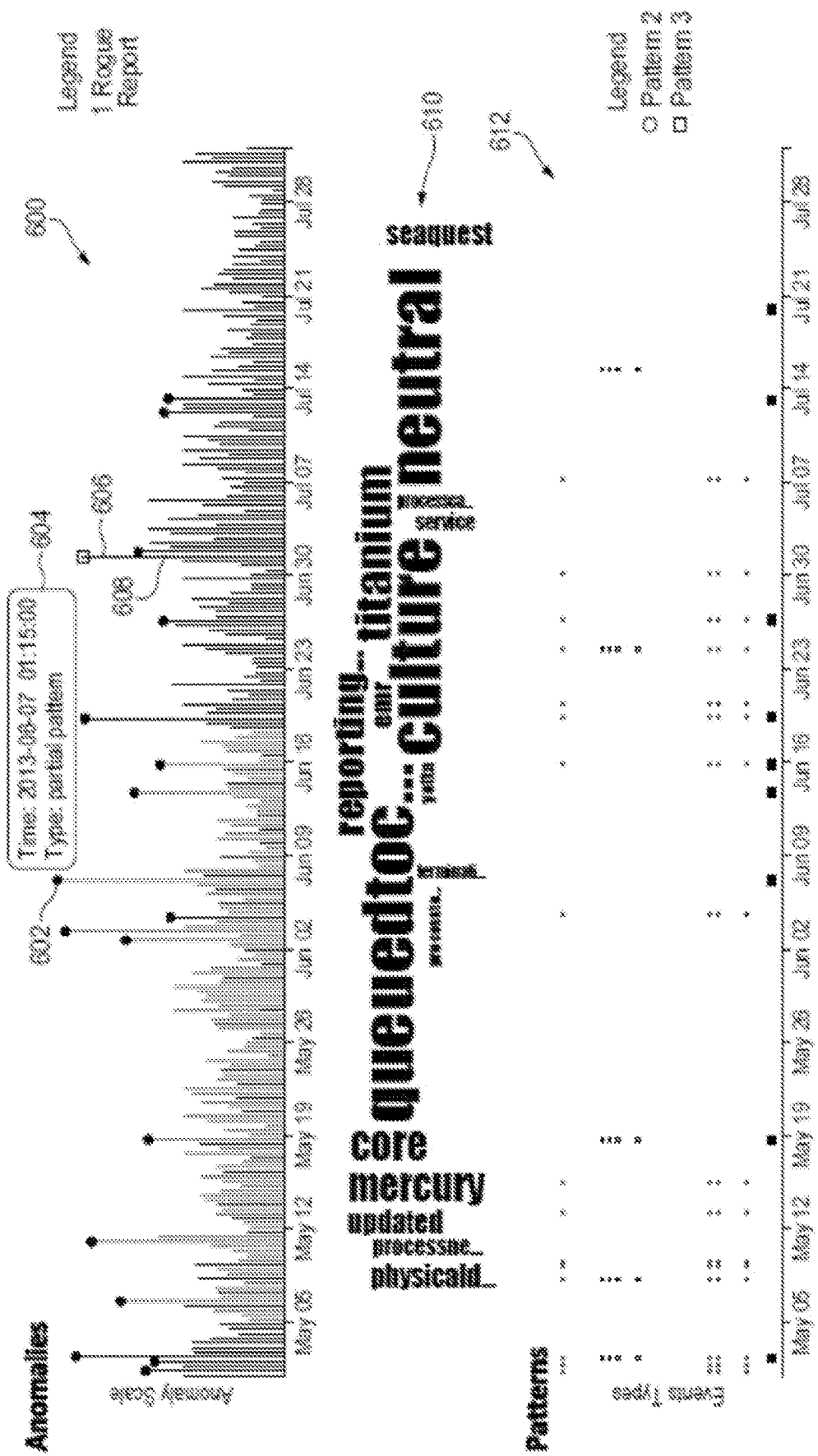
FIG. 6 is an example display of the example output data stream of FIG. 3 after anomaly and pattern interactions.

FIG. 6 is an example display of the example output data stream of FIG. 3 after anomaly and pattern interactions. For example, the output stream illustrated in FIG. 3 may be modified based on the interactions described with reference to FIGS. 4 and 5. For example, interaction processor 106 may receive feedback data that the system anomaly associated with tag 302 and the event pattern 310 (in FIG. 3) have been tagged. Such feedback data may be provided to the anomaly processor 104 and the pattern processor. Based on the feedback data, two new partial pattern system anomalies may be detected, each corresponding to two instances where the "Service Shutdown" event patterns appeared partially. For example, system anomaly 602 may be identified, and pop-up 604 may be displayed, with information related to the system anomaly 602. For example, as illustrated in FIG. 6, the selected system anomaly 602 occurred on "2013-06-07" at "01:15:00". Also, for example, the anomaly type may be indicated as a "partial pattern". Other changes in FIG. 6 are a result of a preference given to the "Variety of Events" system anomaly due to tagging the "Rogue Report" system anomaly, and of deleting a flood of event system anomaly (not illustrated herein). Such interactions may re-evaluate anomaly scores for the system anomalies. For example, an original anomaly score 606 may be marked behind the modified anomaly score 608. Also, for example, word cloud 610 indicates "queuedtoc", "culture", and "neutral" as relevant words. This is different from the word cloud 306 in FIG. 3. Patterns 612 are also displayed based on the interactions described with reference to FIGS. 4 and 5.

In some examples, the anomaly processor 104 may detect future system anomalies based on a previously detected event pattern. For example, by identifying and defining event patterns, the anomaly processor 104 may identify system anomalies when the previously detected event patterns are broken or modified. In some examples, the pattern processor may detect future event patterns based on a previously detected system anomaly. For example, system anomalies associated with a low priority may aggregate to event patterns and may be flagged as high priority event patterns. In some examples, a system anomaly associated with a low priority may be identified based on an absence of a selection of a first selectable option associated with the system anomaly.

As described herein, the interaction processor 106 processes interactions of a domain expert with the interactive graphical user interface 108 based on an explicit tagging of a system anomaly or an event pattern, and also based on a passing interest based on a selection of a particular system anomaly or event pattern. Such feedback data may enrich the input data, enable detection of more refined system anomalies and event patterns, and reprioritize the displayed information on the interactive graphical user interface 108. The analytic tools, including pattern processor and anomaly processor 104, may feed data to each other, and utilize each other to continuously enrich the information provided by the interaction processor 106.

Figure 7:
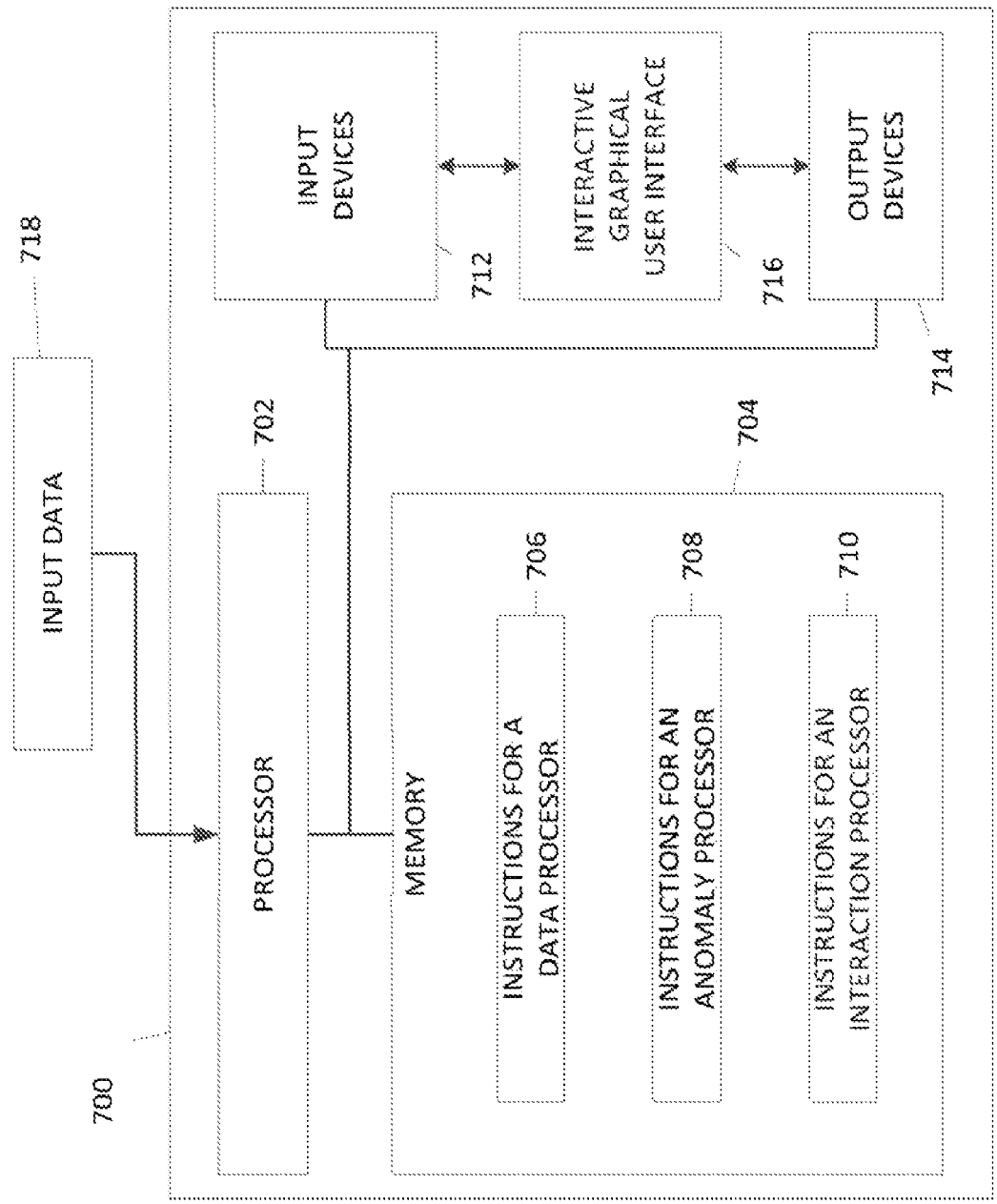
FIG. 7 is a block diagram illustrating an example of a processing system for implementing the system for interactive detection of system anomalies.

FIG. 7 is a block diagram illustrating an example of a processing system 700 for implementing the system 100 for interactive detection of system anomalies. Processing system 700 may include a processor 702, a memory 704, input devices 712, output devices 714, and interactive graphical user interfaces 716 communicatively linked to the input devices 712 and the output devices 714. Processor 702, memory 704, input devices 712, output devices 714, and interactive graphical user interfaces 716 are coupled to each other through communication link (e.g., a bus).

Processor 702 may include a Central Processing Unit (CPU) or another suitable processor. In some examples, memory 704 stores machine readable instructions executed by processor 702 for operating processing system 700. Memory 704 may include any suitable combination of volatile and/or non-volatile memory, such as combinations of Random Access Memory (RAM), Read-Only Memory (ROM), flash memory, and/or other suitable memory.

Memory 704 also stores instructions to be executed by processor 702 including instructions for a data processor 706, an anomaly processor 708, and an interaction processor 710. In some examples, data processor 706, anomaly processor 708, and interaction processor 710, include data processor 102, anomaly processor 104, and interaction processor 106, respectively, as previously described and illustrated with reference to FIG. 1.

Processor 702 executes instructions of data processor 706 to receive input data 718 related to a series of events and telemetry measurements. The input data 718 may be data related to a series of events and telemetry measurements. In some examples, the input data 718 may be a stream of log messages. In some examples, raw input data 718 may comprise log messages, and may be received via the processing system 700, and a data processor 706 may process the input data 718 to generate structured log data.

Processor 702 executes instructions of anomaly processor 708 to detect presence of a system anomaly in the input data 718, the system anomaly indicative of a rare situation that is distant from a norm of a distribution based on the series of events and telemetry measurements. In some examples, processor 702 executes instructions of a pattern processor to detect presence of an event pattern in the input data. In some examples, processor 702 executes instructions of an anomaly processor 708 to generate an output data stream based on the presence of the system anomaly and/or the event pattern.

In some examples, each event in the series of events may be associated with a time, and processor 702 executes instructions of an evaluator (not shown in the figure) to determine, for a time interval, at least one of an anomaly intensity, an anomaly score, an anomaly fingerprint, and a fingerprint matching function. In some examples, processor 702 executes instructions of the anomaly processor 708 to detect a presence of a system anomaly based on the anomaly fingerprint, and the fingerprint matching function.

In some examples, processor 702 executes instructions of an evaluator to determine, for the time interval, anomaly intensities and the anomaly score, and where each anomaly intensity may be transformed, with respect to a distribution of anomaly intensities of the same anomaly type in reference time-slots, based on a distinctive residual rarity extremity score, into comparable, additive, and distinctive anomaly intensity scores that may be combined to determine the anomaly score.

In some examples, each event in the series of events is associated with an event type, a time, and zero or more measurement values, and processor 702 executes instructions of an evaluator to determine, for each event type, an anomaly intensity amount for an anomaly type from events in the time interval, where for each anomaly type, the anomaly intensity amounts for different event types may be combined to determine an anomaly intensity and an anomaly fingerprint.

In some examples, each event may be a signal, and the anomaly intensity in the time interval may be one of a maximal signal value per signal type, a range of signal values per signal type, and a value extremity score.

In some examples, processor 702 executes instructions of a pattern processor (not shown in the figure) to detect future event patterns based on at least one of the feedback data and detected system anomalies.

In some examples, processor 702 executes instructions of an evaluator to determine, for each time interval for an anomaly type, incomparable anomaly intensity amounts, where each incomparable anomaly intensity amount may be transformed with respect to the distribution of associated incomparable anomaly intensity amounts in reference time intervals, based on a distinctive residual rarity extremity score, into comparable, additive, and distinctive anomaly intensity amounts.

In some examples, processor 702 executes instructions of the anomaly processor 708 to generate an interactive analysis interface for system anomalies to be provided via the interactive graphical user interfaces 716. In some examples, processor 702 executes instructions of the anomaly processor 708 to modify the output data stream based on interactions with the analysis interface. In some examples, processor 702 executes instructions of a pattern processor to generate an interactive analysis interface for event patterns to be provided via the interactive graphical user interfaces 716.

In some examples, processor 702 executes instructions of an interaction processor 710 to display, via interactive graphical user interfaces 716, an output data stream based on the presence of the system anomaly and/or the event pattern. In some examples, processor 702 executes instructions of an interaction processor 710 to receive, via interactive graphical user interfaces 716, feedback data associated with the output data stream. In some examples, processor 702 executes instructions of an interaction processor 710 to provide the feedback data to the anomaly processor for operations analytics based on the feedback data.

In some examples, processor 702 executes instructions of an interaction processor 710 to identify selection of an anomaly fingerprint, and processor 702 executes instructions of an evaluator to compute a fingerprint matching score for the anomaly fingerprint in a second time interval, to determine presence or absence of similar system anomalies in the second time interval, the fingerprint matching score computed based on a correlation between the anomaly fingerprint and anomaly intensity amounts in the second time interval.

In some examples, processor 702 executes instructions of the anomaly processor 708 to detect, based on the interactions with the analysis interface, a system anomaly associated with a Partial Pattern anomaly type, and executes instructions of an interaction processor 710 to display, in the modified output data stream, a service shutdown message with the detected system anomaly.

In some examples, processor 702 executes instructions of an interaction processor 710 to display the output data stream, including a first selectable option associated with the system anomaly, and/or a second selectable option associated with the event pattern, receive feedback data associated with the first and/or second selectable options, and provide the feedback data to the anomaly processor 708. In some examples, processor 702 executes instructions of an interaction processor 710 to further provide, in response to a selection of the first selectable option, a pop-up card with information related to the system anomaly. In some examples, processor 702 executes instructions of an interaction processor 710 to further provide, in response to a selection of the first selectable option, an analysis interface to analyze the system anomaly. In some examples, processor 702 executes instructions of an interaction processor 710 to further provide, in response to a selection of the second selectable option, an analysis interface to analyze the event pattern. In some examples, processor 702 executes instructions of an interaction processor 710 to display a word cloud, the word cloud highlighting words that appear in log messages associated with the system anomaly more than in the rest of the log messages.

Input devices 712 include a keyboard, mouse, data ports, and/or other suitable devices for inputting information into processing system 200. In some examples, input devices 712 are used to by the interaction processor 710 to interact with the user. Output devices 714 include a monitor, speakers, data ports, and/or other suitable devices for outputting information from processing system 700. In some examples, output devices 714 are used to provide interactive graphical user interfaces 716.

Figure 8:
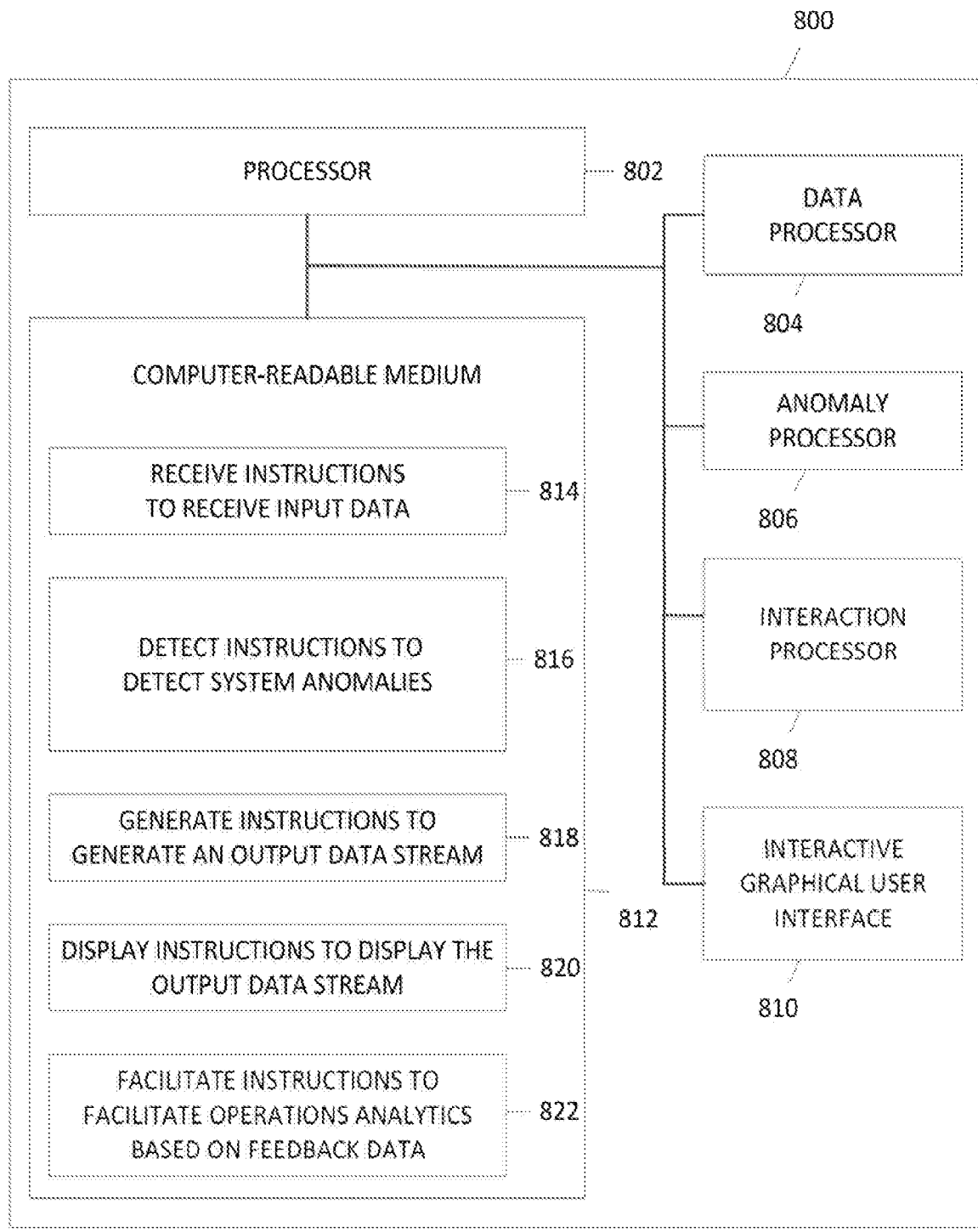
FIG. 8 is a block diagram illustrating an example of a computer readable medium for interactive detection of system anomalies.

FIG. 8 is a block diagram illustrating an example of a computer readable medium for interactive detection of system anomalies. Processing system 800 may include a processor 802, a computer readable medium 812, a data processor 804, an anomaly processor 806, an interaction processor 808, and an interactive graphical user interface 810. Processor 802, computer readable medium 812, data processor 804, anomaly processor 806, interaction processor 808, and interactive graphical user interface 810, are coupled to each other through communication link (e.g., a bus).

Processor 802 executes instructions included in the computer readable medium 812. Computer readable medium 812 may include receive instructions 814 of a data processor 804 to receive input data related to a series of events and telemetry measurements. Computer readable medium 812 may include detect instructions 816 of an anomaly processor 806 to detect system anomalies in the input data. In some examples, computer readable medium 812 may include detect instructions 816 of a pattern processor to detect event patterns.

Computer readable medium 812 may include generate instructions 818 of an interaction processor 808 to generate an output data stream based on detected system anomalies. Computer readable medium 812 may include display instructions 820 of an interaction processor 808 to display the output data stream via an interactive graphical user interface 810. In some examples, computer readable medium 812 may include feedback data receipt instructions of an interaction processor 808 to receive feedback data associated with the output data stream.

In some examples, computer readable medium 812 may include aggregate instructions of an anomaly processor 806 to aggregate heterogeneous system anomalies detected from heterogeneous input data, where the input data may include event streams, performance metrics, log messages, and event patterns.

In some examples, computer readable medium 812 may include instructions of an interaction processor 808 to display the output data stream, including a first selectable option associated with the system anomaly, and/or a second selectable option associated with the event pattern, receive feedback data associated with the first and/or second selectable options, and provide the feedback data to the anomaly processor 806.

In some examples, computer readable medium 812 may include instructions of an interaction processor 808 to further provide, in response to a selection of the first selectable option, a pop-up card with information related to the system anomaly. In some examples, computer readable medium 812 may include instructions of an interaction processor 808 to further provide, in response to a selection of the first selectable option, an analysis interface to analyze the system anomaly. In some examples, computer readable medium 812 may include instructions of an interaction processor 808 to further provide, in response to a selection of the second selectable option, an analysis interface to analyze the event pattern. In some examples, computer readable medium 812 may include display instructions 820 of an interaction processor 808 to display a word cloud, the word cloud highlighting words that appear in log messages associated with the system anomaly more than in the rest of the log messages.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 812 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 400 are identified and refer to a combination of hardware and programming configured to perform a designated function. As illustrated in FIG. 8, the programming may be processor executable instructions stored on tangible computer readable medium 812, and the hardware may include processor 802 for executing those instructions. Thus, computer readable medium 812 may store program instructions that, when executed by processor 802, implement the various components of the processing system 800.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 812 may be any of a number of memory components capable of storing instructions that can be executed by processor 802. Computer readable medium 812 may be non-transitory in the sense that it does not encompass a transitory signal but instead is made up of one or more memory components configured to store the relevant instructions. Computer readable medium 812 may be implemented in a single device or distributed across devices. Likewise, processor 802 represents any number of processors capable of executing instructions stored by computer readable medium 812. Processor 802 may be integrated in a single device or distributed across devices. Further, computer readable medium 812 may be fully or partially integrated in the same device as processor 802 (as illustrated), or it may be separate but accessible to that device and processor 802. In some examples, computer readable medium 812 may be a machine-readable storage medium.

Figure 9:
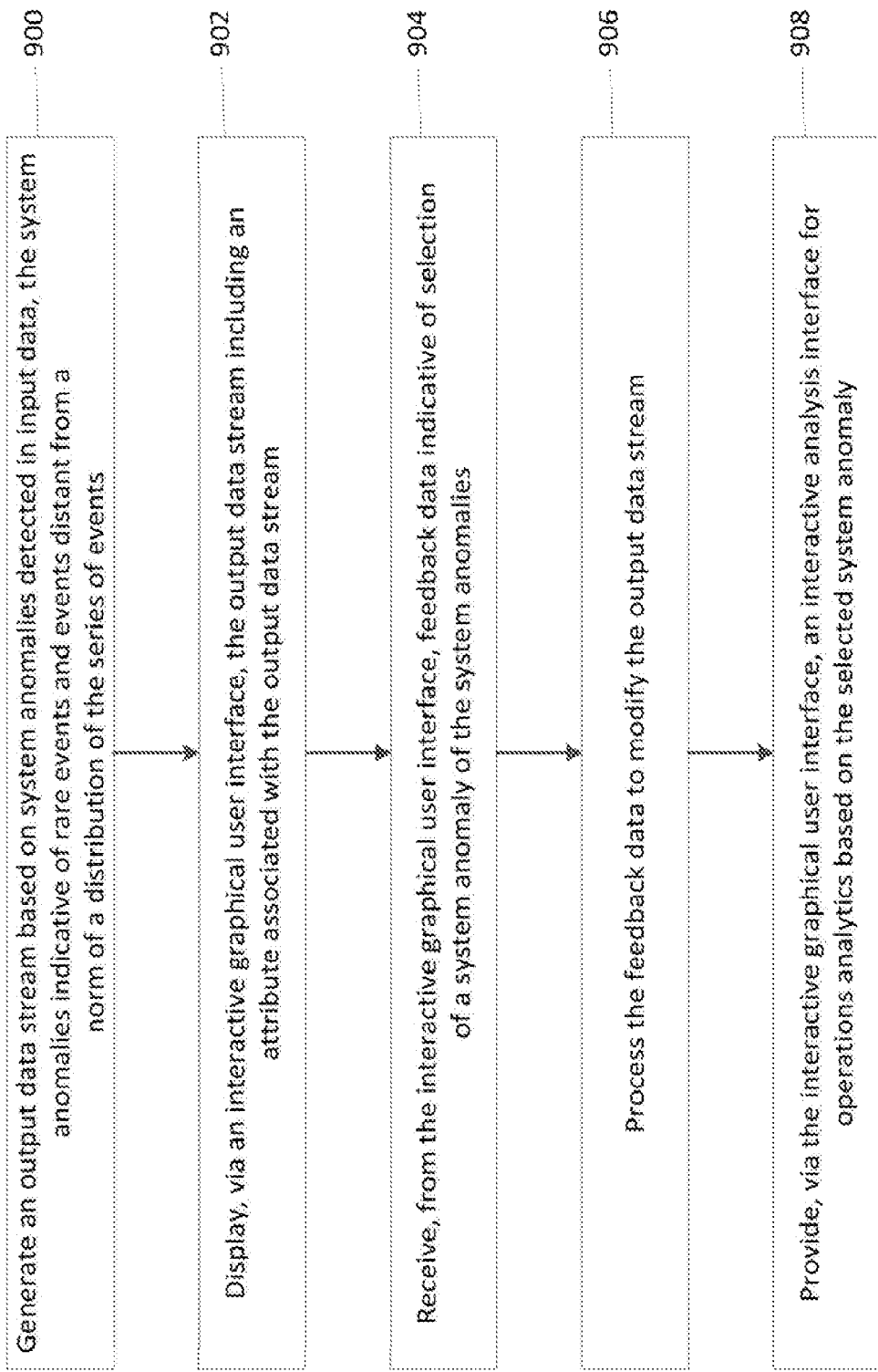
FIG. 9 is a flow diagram illustrating an example of a method for interactive detection of system anomalies.

FIG. 9 is a flow diagram illustrating an example of a method for interactive detection of system anomalies. At 900, an output data stream may be generated based on system anomalies detected in input data, the system anomalies indicative of rare events and events distant from a norm of a distribution of the series of events. At 902, the output data stream may be displayed via an interactive graphical user interface, the output data stream including an attribute associated with the output data stream. At 904, feedback data indicative of selection of a system anomaly may be received from the interactive graphical user interface. At 906, the feedback data may be processed to modify the output data stream. At 908, an interactive analysis interface may be provided, via the interactive graphical user interface, for operations analytics based on the selected system anomaly.

In some examples, the attribute associated with the output data stream may include an anomaly intensity, an anomaly score, an anomaly Fingerprint, a fingerprint matching function, event patterns, a word cloud, an anomaly type, a service message associated with a selected system anomaly, an anomaly intensity for events in a time interval, an event count extremity factor, and an event type rarity factor.

In some examples, each event in the series of events may be associated with a time, and the method may include determining, for a time interval, at least one of an anomaly intensity, an anomaly score, an anomaly fingerprint, a fingerprint matching function, and event patterns. In some examples, the method may include detecting system anomalies based on the anomaly fingerprint, and the fingerprint matching function.

In some examples, each system anomaly may be associated with a time, and the method may include determining, for a time interval, at least one of an anomaly intensity, an anomaly score, an anomaly fingerprint, and a fingerprint matching function.

In some examples, the method may include detecting a presence of a system anomaly based on the anomaly fingerprint, and the fingerprint matching function.

In some examples, the method may include determining, for the time interval, anomaly intensities and the anomaly score, and where each anomaly intensity may be transformed, with respect to a distribution of anomaly intensities of the same anomaly type in reference time-slots, based on a distinctive residual rarity extremity score, into comparable, additive, and distinctive anomaly intensity scores that may be combined to determine the anomaly score.

In some examples, each event in the series of events is associated with an event type, a time, and zero or more measurement values, and the method may include determining, for each event type, an anomaly intensity amount for an anomaly type from events in the time interval, where for each anomaly type, the anomaly intensity amounts for different event types may be combined to determine an anomaly intensity and an anomaly fingerprint.

In some examples, the method may include determining, for each time interval for an anomaly type, incomparable anomaly intensity amounts, where each incomparable anomaly intensity amount may be transformed with respect to the distribution of associated incomparable anomaly intensity amounts in reference time intervals, based on a distinctive residual rarity extremity score, into comparable, additive, and distinctive anomaly intensity amounts.

In some examples, the anomaly type may include a Flood of Events, where the anomaly intensity amount is an event count; a Variety of Events, where the anomaly intensity amount is an event occurrence indicator; a Flood of Rare Events, where the anomaly intensity amount is a product of an event count extremity factor, and an event-type rarity factor; and a Flood of Extreme Signals, where the anomaly intensity amount is a maximal signal value per time interval transformed based on a distinctive residual rarity extremity score.

In some examples, the method may include identifying selection of an anomaly fingerprint, and where a fingerprint matching score for the anomaly fingerprint is computed in a second time interval to determine presence or absence of similar system anomalies in the second time interval, where the fingerprint matching score is computed based on a correlation between the anomaly fingerprint and anomaly intensity amounts in the second time interval.

In some examples, the method may include generating an interactive analysis interface to be provided via the interactive graphical user interface, and modifying the output data stream based on interactions with the analysis interface. In some examples, the method may include detecting, based on the interactions with the analysis interface, a system anomaly associated with a Partial Pattern anomaly type, and displaying, in the modified output data stream, a service shutdown message with the detected system anomaly. In some examples, the analysis interface may be an anomaly analysis interface to analyze the system anomaly. In some examples, the analysis interface may be a pattern analysis interface to analyze the event pattern.

In some examples, the feedback data may include indication of a selection of a system anomaly, and based on the feedback data the interaction processor further provides, via the graphical user interface, a pop-up card with information related to the selected system anomaly.

In some examples, the feedback data may include the anomaly score, a modified anomaly score, an anomaly fingerprint, and acceptance or rejection of an anomaly finger matching result.

In some examples, the method may include displaying a word cloud, the word cloud highlighting words that appear in log messages associated with the system anomaly. For example, key terms may appear in log messages associated with the system anomaly more frequently than in the rest of the log messages. Accordingly, such key terms may be highlighted in the word cloud. Highlighting may be achieved via a distinctive font, font size, color, and so forth. In some examples, term scores may be determined for key terms, the term scores based on a modified inverse domain frequency. In some examples, the modified inverse domain frequency may be based on an information gain or a Kullback-Liebler Divergence.

In some examples, the method may include aggregating heterogeneous system anomalies detected from heterogeneous input data, where the input data may include event streams, performance metrics, log messages, and event patterns.

Examples of the disclosure provide a generalized system for interactive detection of system anomalies. The generalized system provides for analyzing and managing operations data. The purpose of the system may be to facilitate managing operations of complex and distributed systems, making sure that they are continuously performing at their best, and whenever there may be a problem, to be able to resolve it quickly and save the problem fingerprint for future prevention and fast resolution. As described herein, data streams of various types streams into the system which analyses it automatically to provide an interface where data anomalies may be constantly prioritized so that the highest recent system anomalies may be visualized prominently.

Although the techniques described herein enable automatic detection of system anomalies (e.g., without a query), such automatic detection techniques may be combined with known system anomalies, and/or query-based detection of system anomalies to form a hybrid system.

Although specific examples have been illustrated and described herein, the examples illustrate applications to any input data. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
   a processor;
   a non-transitory computer readable medium on which is stored instructions that when executed by the processor, cause the processor to:
   receive input data related to a series of events, each event among the series of events being associated with a respective event type in a reference group of event types;
   generate an anomaly score based on a number of each event type in the series of events and a rarity of each event type with respect to other event types in the reference group of event types;
   detect presence of a system anomaly based on the anomaly score;
   compare the series of events of the system anomaly to previous series of events of previous system anomalies that were presented to users and for which interactions were received from the users, wherein the interactions indicate whether or not the previous system anomalies were of interest to the users;
   determine that the system anomaly is of potential interest based on the comparison;
   generate, to be displayed via an interactive graphical user interface, an output data stream based on the determination that the system anomaly is of potential interest;
   receive, from the interactive graphical user interface, feedback data associated with the output data stream; and
   store the feedback data as an interaction for comparison with subsequent system anomalies.

2. The system of claim 1, wherein the system anomaly is associated with a time, and wherein the instructions when executed by the processor, further cause the processor to: determine, for a time interval, at least one of an anomaly intensity, the anomaly score, an anomaly fingerprint, and a fingerprint matching function.

3. The system of claim 2, wherein the instructions when executed by the processor, further cause the processor to: detect a presence of the system anomaly based on the anomaly fingerprint, and the fingerprint matching function.

4. The system of claim 2, wherein the instructions when executed by the processor, further cause the processor to:
   determine, for the time interval, anomaly intensities, including the anomaly intensity, and the anomaly score, and wherein each anomaly intensity from among the anomaly intensities is to be transformed, with respect to a distribution of anomaly intensities of an anomaly type in reference time-slots, based on a distinctive residual rarity extremity score, into comparable, additive, and distinctive anomaly intensity scores that are combined to determine the anomaly score.

5. The system of claim 2, wherein each event in the series of events is associated with an event type, a time, and zero or more measurement values, and wherein the instructions when executed by the processor, further cause the processor to:
   determine, for each event type, an anomaly intensity amount for an anomaly type from events in the time interval, wherein for each anomaly type, the anomaly intensity amounts for different event types are combined to determine the anomaly intensity and the anomaly fingerprint, and wherein the anomaly fingerprint is based on a set of relative contributions of event types to the anomaly intensity.

6. The system of claim 5, wherein the instructions when executed by the processor, further cause the processor to:
   determine, for the time interval for an anomaly type, incomparable anomaly intensity amounts, wherein each incomparable anomaly intensity amount is transformed with respect to a distribution of associated incomparable anomaly intensity amounts in reference time intervals, based on a distinctive residual rarity extremity score, into comparable, additive, and distinctive anomaly intensity amounts.

7. The system of claim 5, wherein the anomaly type is selected from among:
   a Flood of Events, wherein the anomaly intensity amount is an event count,
   a Variety of Events, wherein the anomaly intensity amount is an event occurrence indicator,
   a Flood of Rare Events, wherein the anomaly intensity amount is a product of an event count extremity factor, and an event-type rarity factor, and
   a Flood of Extreme Signals, wherein the anomaly intensity amount is a maximal signal value per time interval transformed based on a distinctive residual rarity extremity score.

8. The system of claim 5, wherein the instructions when executed by the processor, further cause the processor to:
   identify the anomaly fingerprint, and wherein a fingerprint matching score for the anomaly fingerprint is computed in a second time interval to determine presence or absence of similar system anomalies in the second time interval, the fingerprint matching score computed based on a correlation between the anomaly fingerprint and anomaly intensity amounts in the second time interval.

9. The system of claim 1, wherein the instructions when executed by the processor, further cause the processor to:
   generate an interactive analysis interface to be provided via the interactive graphical user interface, and modify the output data stream based on interactions with the interactive analysis interface.

10. The system of claim 9, wherein the instructions when executed by the processor, further cause the processor to:

detect, based on the interactions with the interactive analysis interface, a system anomaly associated with a Partial Pattern anomaly type.

11. The system of claim 1, wherein the instructions when executed by the processor, further cause the processor to:
detect event patterns based on at least one of the feedback data and the previous system anomalies.

12. The system of claim 1, wherein the instructions when executed by the processor, further cause the processor to:
generate a word cloud to be displayed via the interactive graphical user interface, the word cloud highlighting words that appear in log messages associated with a selected system anomaly.

13. A method comprising:
receiving, by a processor, input data related to a series of events, each event in the series of events being associated with a respective event type in a reference group of event types;
generating, by the processor, for each event type in the reference group of event types, a respective component anomaly score based on a number of the event types in the series of events and a rarity of the event type with respect to other event types in the reference group of event types;
generating, by the processor, an anomaly score based on the respective component anomaly score generated for each event type in the reference group of events types;
generating, by the processor, an output data stream based on system anomalies detected based on the anomaly score and other anomaly scores;
generating, by the processor, to be displayed via an interactive graphical user interface, the output data stream including an attribute associated with the output data stream;
receiving, by the processor, from the interactive graphical user interface, feedback data indicative of selection of a system anomaly;
processing, by the processor, the feedback data to modify the output data stream;
providing, by the processor, via the interactive graphical user interface, an interactive analysis interface for operations analytics based on the selected system anomaly;
comparing, by the processor, a second system anomaly to the selected system anomaly;
determining, by the processor, that the second system anomaly is of potential interest based on the comparison; and
displaying, by the processor, via the interactive graphical user interface, the second system anomaly.

14. The method of claim 13, wherein the attribute associated with the output data stream includes at least one of an anomaly intensity, the anomaly score, an anomaly fingerprint, a fingerprint matching function, event patterns, a word cloud, an anomaly type, a service message associated with the selected system anomaly, an anomaly intensity for events in a time interval, an event count extremity factor, and an event type rarity factor.

15. A non-transitory computer readable medium comprising executable instructions that when executed by a processor cause the processor to:
receive input data related to a series of events, each event in the series of events being associated with a respective event type in a reference group of event types;
generate an anomaly score based on a number of each event type in the series of events and a rarity of each event type with respect to other event types in the reference group of event types;
detect a system anomaly based on the anomaly score;
generate an output data stream based on the detected system anomaly;
provide the output data stream to be displayed via an interactive graphical user interface;
facilitate operations analytics of the series of events based on feedback data indicative of interactions with the output data stream, the interactions including selection of the system anomaly;
compare a second system anomaly to the selected system anomaly;
determine that the second system anomaly is of potential interest based on the comparison; and
display, via the interactive graphical user interface, the second system anomaly.

16. The non-transitory computer readable medium of 15, wherein the input data comprises a plurality of unstructured messages related to the series of events, each of the unstructured messages having a corresponding format such that the input data has heterogeneous data formats, and wherein to detect the system anomaly, the instructions when executed by the processor further cause the processor to:
determine a set of structured message types and parameters based on the plurality of unstructured messages;
generate a regular expression for matching each of the plurality of unstructured messages based on the set of structured message types and parameters; and
identify an event type for each of the plurality of unstructured messages based on the regular expression.

17. The non-transitory computer readable medium of 15, wherein the instructions when executed by the processor further cause the processor to:
identify a subset of the series of events in a time interval, wherein the selected system anomaly is detected based on the subset of the series of events in the time interval.

18. The non-transitory computer readable medium of 17, wherein the instructions when executed by the processor further cause the processor to:
generate an anomaly fingerprint based on the identified subset of the series of events;
store the anomaly fingerprint;
generate a second anomaly fingerprint based on a second subset of the series of events, the second anomaly fingerprint being associated with the second system anomaly,
wherein the comparison of the second system anomaly to the selected system anomaly is based on a comparison of the anomaly fingerprint with the second anomaly fingerprint; and
determine that the second system anomaly is similar to the selected system anomaly based on the comparison, wherein the determination that the second system anomaly is of potential interest is based on the determination that the second system anomaly is similar to the selected system anomaly.

19. The non-transitory computer readable medium of 15, wherein the instructions when executed by the processor further cause the processor to:
assign a second anomaly score to the second system anomaly, the second anomaly score indicative of a level of potential interest of the second system anomaly;
determine that the selected system anomaly was interacted with to obtain further information relating to the selected system anomaly; and adjust the second anomaly score to indicate that the second system anomaly is of greater interest than before the determination that the selected system anomaly was interacted with to obtain further information relating to the selected system anomaly.

20. The non-transitory computer readable medium of 19, wherein the instructions when executed by the processor further cause the processor to:

detect a third system anomaly based on the input data;

compare the third system anomaly to a set of previous system anomalies;

determine that the set of previous system anomalies were presented to users and that interactions with the set of previous system anomalies were not received from the users; and determine that the third system anomaly is not of potential interest based on the comparison of the third system anomaly to the set of previous system anomalies and the determination that the set of previous system anomalies were presented to users and that interactions with the set of previous system anomalies were not received from the users.

* * * * *